US012756713B2

(12) United States Patent
Ramamoorthy et al.

(10) Patent No.: US 12,756,713 B2
(45) Date of Patent: Oct. 6, 2026

(54) METHOD AND APPARATUS FOR MANAGING MISSION CRITICAL DATA

(71) Applicant: Samsung Electronics Co., Ltd., Suwon-si (KR)

(72) Inventors: Arunprasath Ramamoorthy, Bangalore (IN); Kiran Gurudev Kapale, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 18/687,752

(22) PCT Filed: Aug. 30, 2022

(86) PCT No.: PCT/KR2022/012930

§ 371 (c)(1),
(2) Date: Feb. 28, 2024

(87) PCT Pub. No.: WO2023/033501

PCT Pub. Date: Mar. 9, 2023

(65) Prior Publication Data

US 2024/0430265 A1 Dec. 26, 2024

(30) Foreign Application Priority Data

Sep. 2, 2021 (IN) ............................. 202141039858
Aug. 19, 2022 (IN) ............................. 202141039858

(51) Int. Cl.
*H04L 9/40* (2022.01)

(52) U.S. Cl.
CPC ............ *H04L 63/102* (2013.01); *H04L 63/08* (2013.01)

(58) Field of Classification Search
CPC ..... H04L 9/0891; H04L 9/0894; H04L 63/08; H04L 63/102; H04L 63/20; H04L 67/306
See application file for complete search history.

(56) References Cited

U.S. PATENT DOCUMENTS

| | | | | |
|---|---|---|---|---|
| 2015/0067353 | A1* | 3/2015 | Hui | H04L 9/088 713/193 |
| 2017/0244693 | A1* | 8/2017 | Papadopoulos | H04L 9/0861 |
| 2019/0199666 | A1* | 6/2019 | Pattan | H04L 51/23 |
| 2019/0273773 | A1* | 9/2019 | Pattan | H04L 67/06 |

(Continued)

OTHER PUBLICATIONS

International Search Report and Written Opinion of the International Searching Authority dated Dec. 1, 2023, in connection with International Application No. PCT/KR2022/012930, 10 pages.

(Continued)

*Primary Examiner* — Gil H. Lee

(57) ABSTRACT

A method for managing mission critical data (MCData) by an MCData server is provided. The method comprises receiving a request message for controlling a storage of MCData communications into an MCData message store from an MCData client device; identifying whether a user of the MCData client device is authorized; controlling the storage of the MCData communications based on the request message, in case of identifying that the MCData client device is authorized; and transmitting, to the MCData client device, a response message in response to the request message.

19 Claims, 7 Drawing Sheets

(56) References Cited

U.S. PATENT DOCUMENTS

| | | | | |
|---|---|---|---|---|
| 2019/0387398 | A1* | 12/2019 | Rajadurai | H04W 12/106 |
| 2021/0099496 | A1* | 4/2021 | Shah | H04W 4/10 |

OTHER PUBLICATIONS

Examination report dated Nov. 2, 2023, in connection with Indian Application No. 202141039858, 7 pages.

3GPP TS 23.282 V17.4.0 (Sep. 2020), Technical Specification, 3rd Generation Partnership Project; Technical Specification Group Services and System Aspects; Functional architecture and information flows to support Mission Critical Data (MCData); Stage 2 (Release 17), Sep. 2020, 218 pages.

3GPP TS 23.282 V17.7.0 (Jun. 2021), Technical Specification, 3rd Generation Partnership Project; Technical Specification Group Services and System Aspects; Functional architecture and information flows to support Mission Critical Data (MCData); Stage 2 (Release 17), Jun. 2021, 233 pages.

3GPP TS 24.282 V16.7.0 (Jun. 2021), Technical Specification, 3rd Generation Partnership Project; Technical Specification Group Core Network and Terminals; Mission Critical Data (MDData) signalling control; Protocol specification (Release 16), Jun. 2021, 374 pages.

Samsung, "Correction of preconditions and statements related to storing of MCData communication into Message store," S6-211929 (revision of S6-21xxxx), 3GPP TSG-SA WG6 Meeting #45, e-meeting Aug. 25-Sep. 3, 2021, 6 pages.

Samsung, "Correction of preconditions and statements related to storing of MCData communication into Message store," S6-212083 (revision of S6-211929), 3GPP TSG-SA WG6 Meeting #45, e-meeting Aug. 25-Sep. 3, 2021, 18 pages.

* cited by examiner

[Fig. 1]
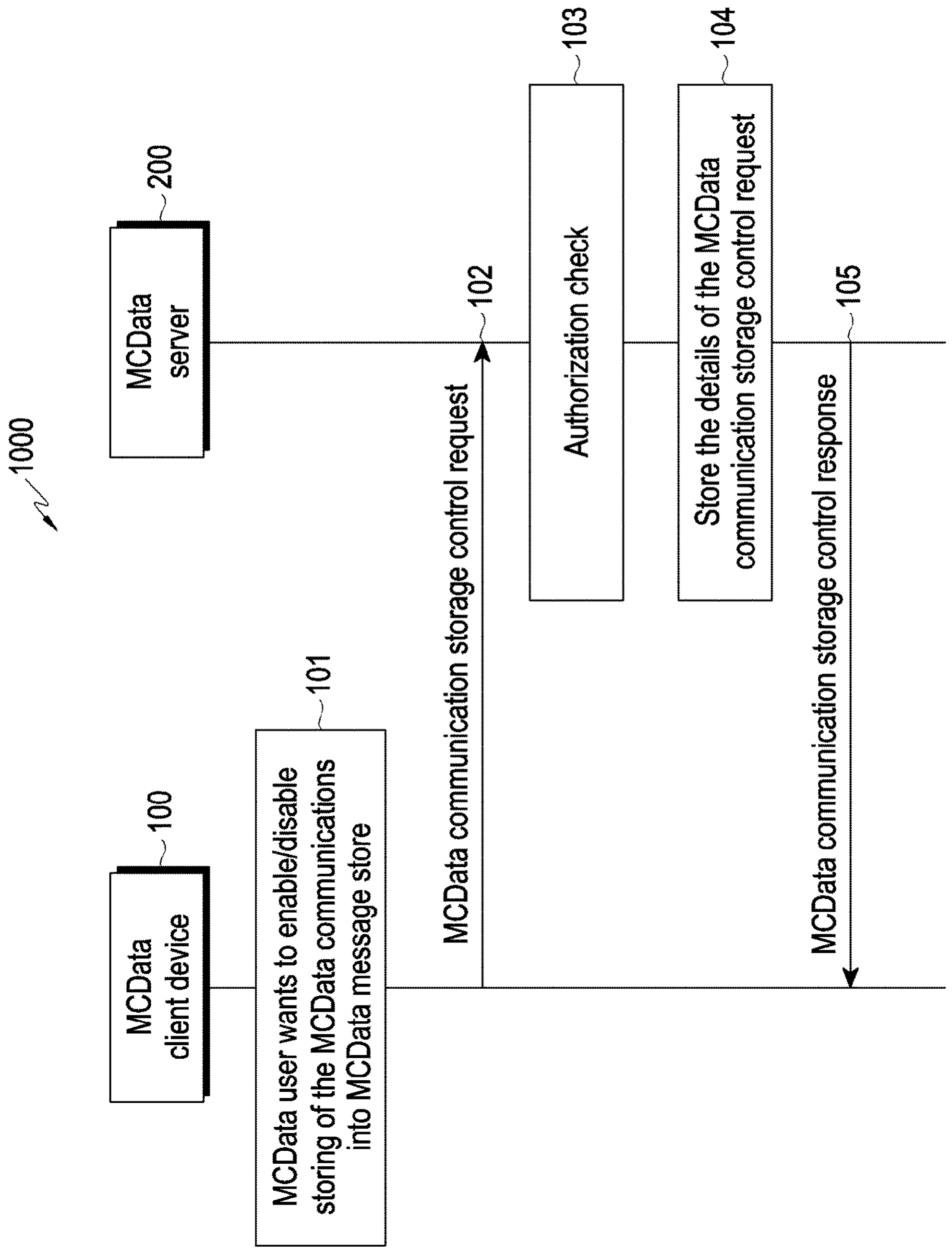

[Fig. 2]
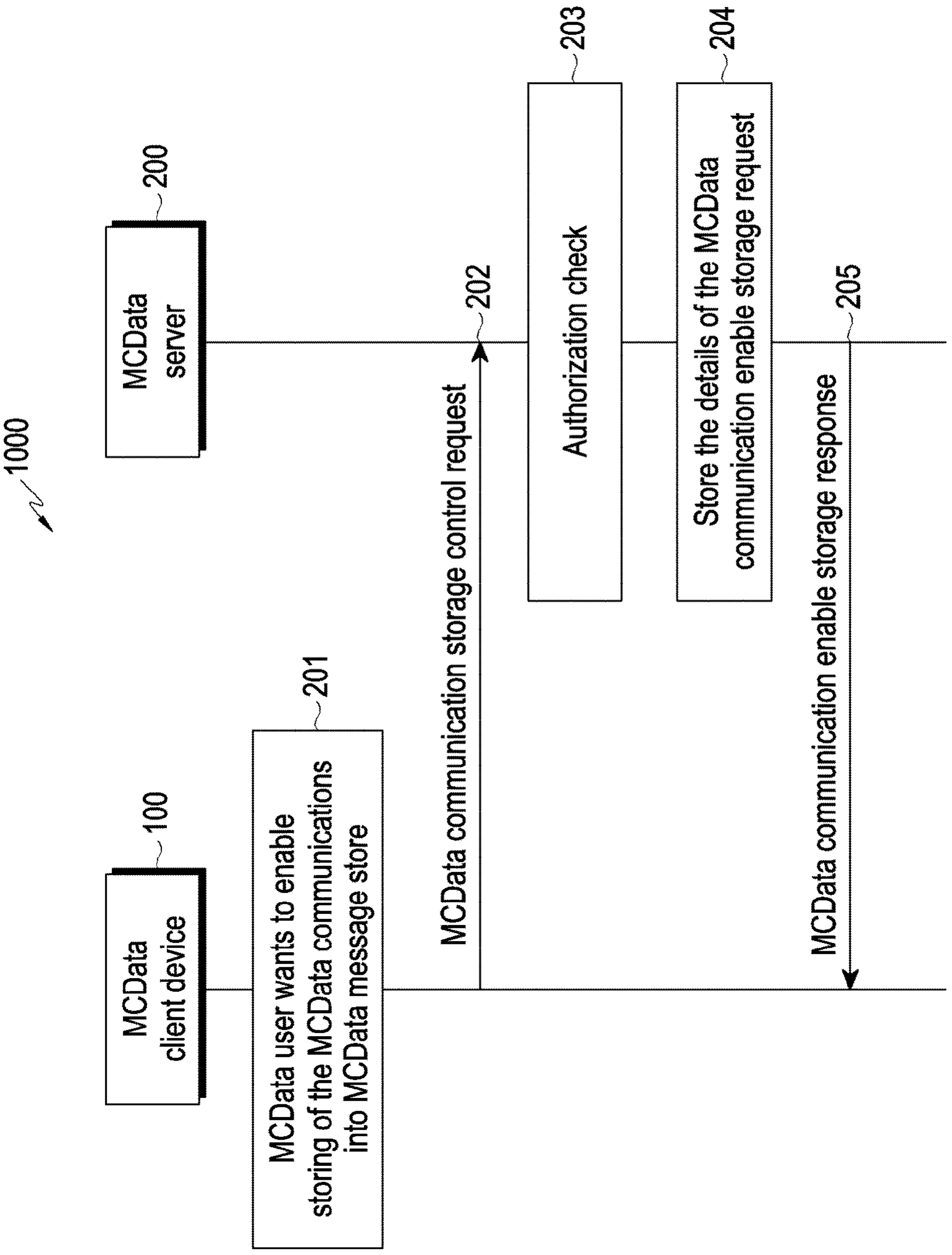

[Fig. 3]
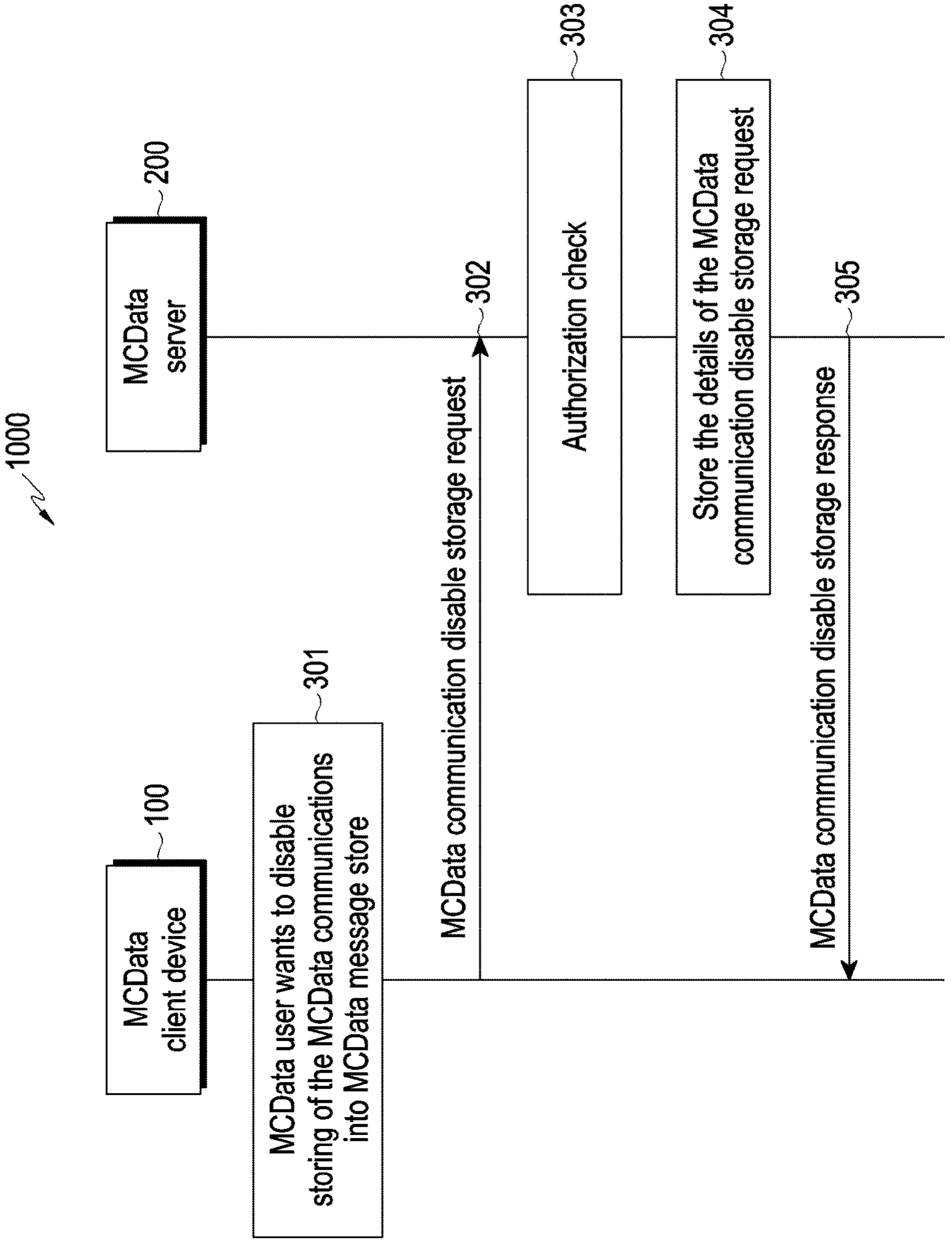

[Fig. 4]
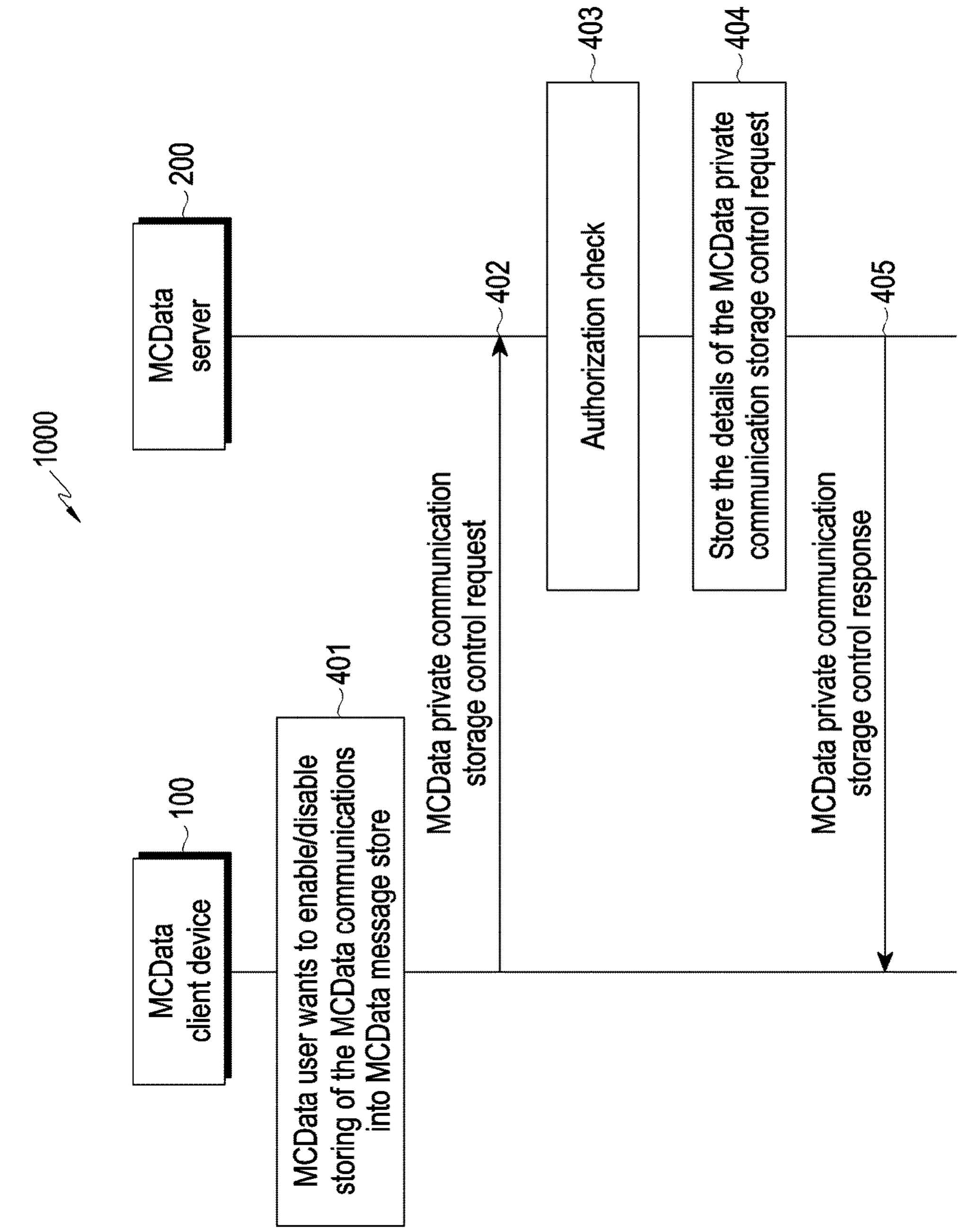

[Fig. 5]
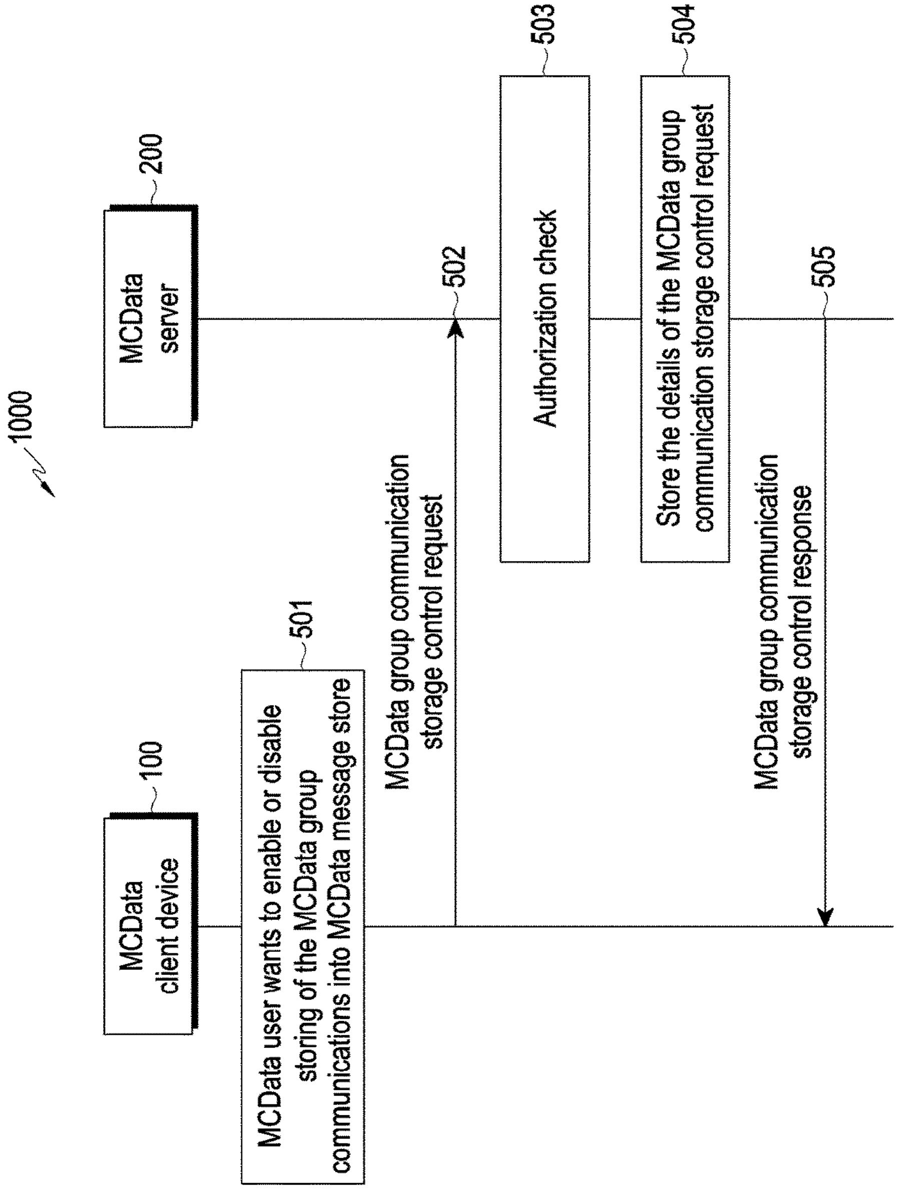
[Fig. 6]
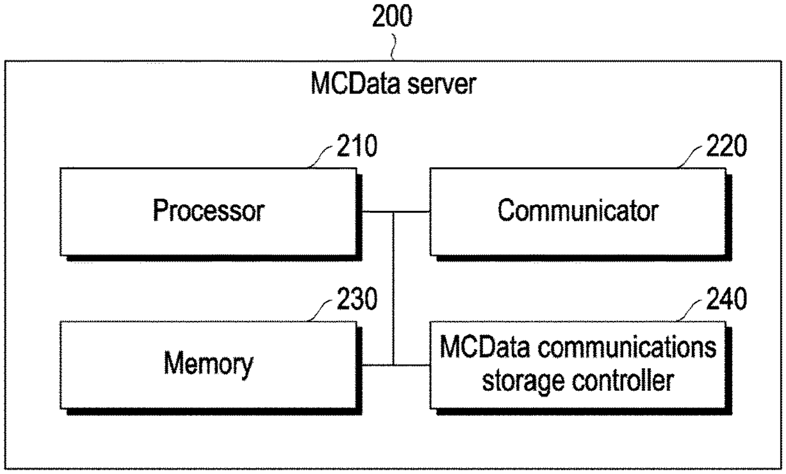

[Fig. 7]
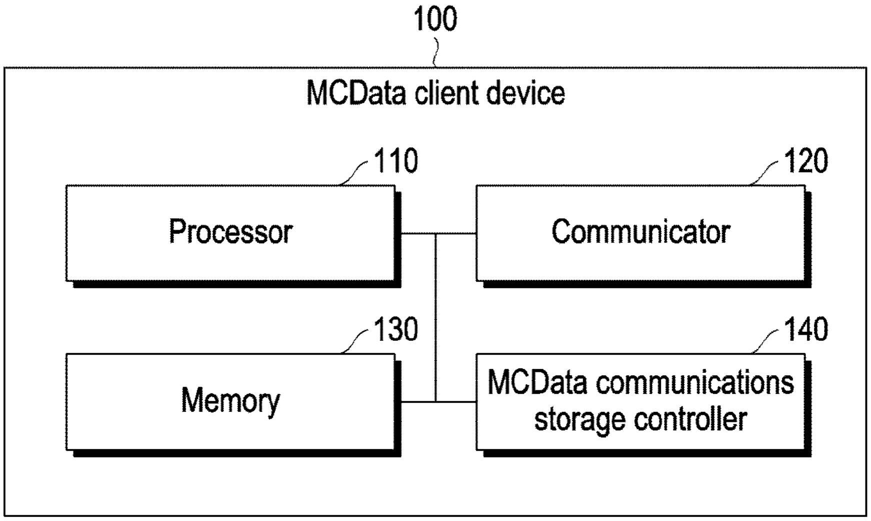
[Fig. 8]
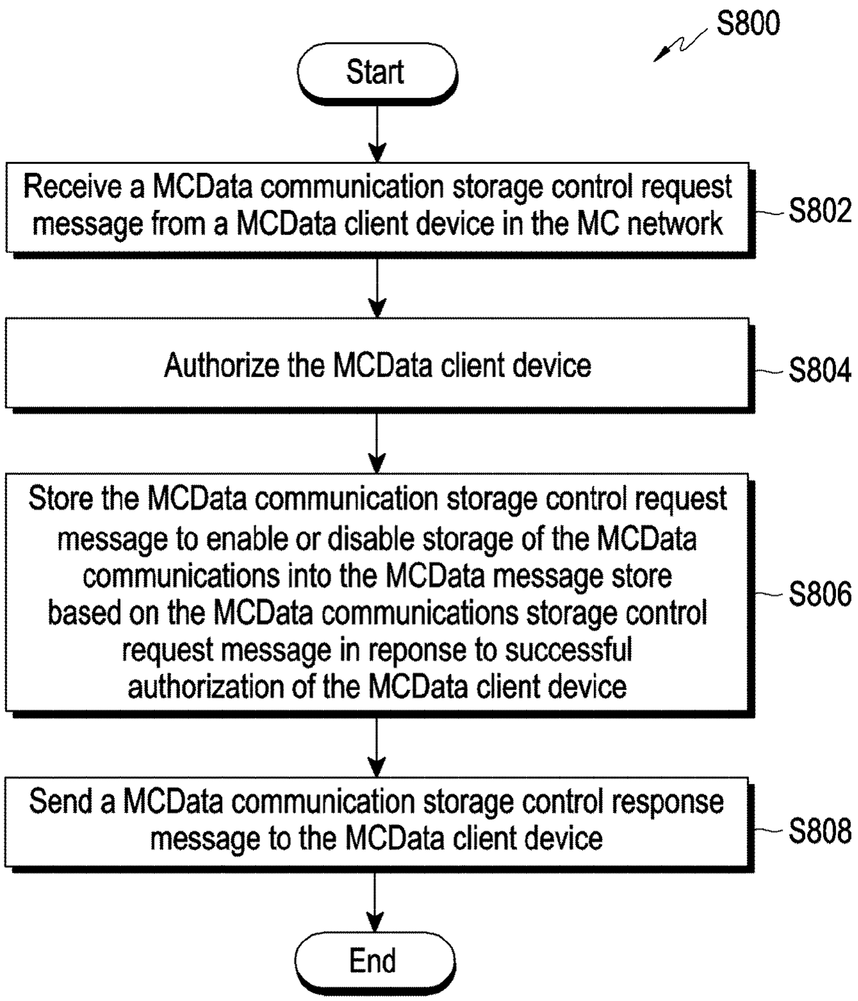

[Fig. 9]
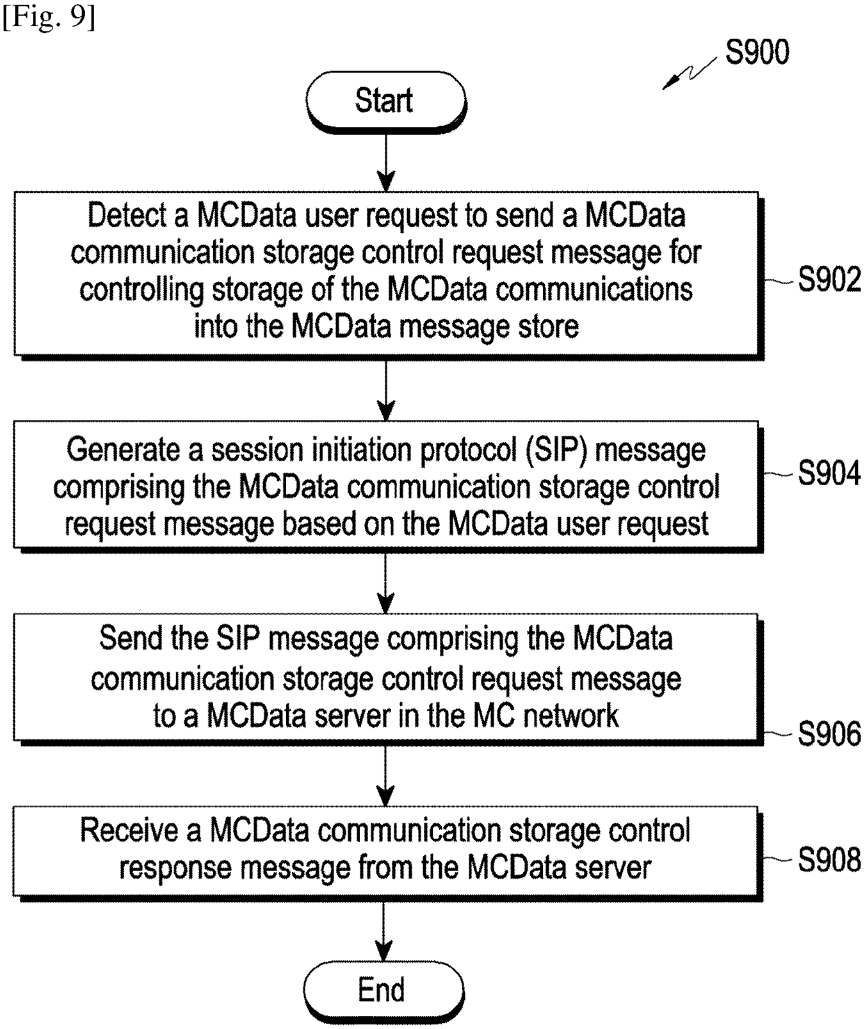

METHOD AND APPARATUS FOR MANAGING MISSION CRITICAL DATA

CROSS-REFERENCE TO RELATED APPLICATIONS

This application is a U.S. National Phase Entry of PCT International Application No. PCT/KR2022/012930, which was filed on Aug. 30, 2022, and claims priority to Indian Patent Application number 202141039858 and Indian Patent Application number 202141039858, which were filed in the Indian Patent Office on Sep. 2, 2021 and Aug. 19, 2022, respectively, the entire disclosure of each of which is incorporated herein by reference.

TECHNICAL FIELD

The present disclosure relates to a mission critical data (MCData) services. The MCData service provides a MCData message store that is used by MCData users to store their MCData communications permanently. The patent disclosure proposes a MC network and a method for the MCData users that how to request a MCData server whether to store the user MCData communications into the MCData message store account of the MCData user or not.

BACKGROUND ART

In wireless communication and networks, a MCData service provides the support of archiving the MCData user's communication into the MCData message store which is permanent network storage. The MCData message store provides secured storage area for each authorized MCData user having a user account. The storage area is identified by the MCData user's MCData identifier (ID). The MCData message store shall allow the MCData user to access only the storage area that he is authorized to access. The user (i.e. a dispatcher) other than the user account holder shall be able to access the account holder's storage area if authorized.

Currently there is no method defined for how the MCData user can request whether or not to store his/her MCData communications into the MCData message store.

Thus, it is desired to address the above mentioned disadvantages or other shortcomings or at least provide a useful alternative.

DISCLOSURE OF INVENTION

Technical Problem

The principal object of the embodiments herein is to provide a MC network and a method to enable and disable storage of MCData communications into a MCData message store.

Solution to Problem

According to an embodiment of the present disclosure, a method for managing mission critical data (MCData) by an MCData server is provided. The method may comprise receiving a request message for controlling a storage of MCData communications into an MCData message store from an MCData client device. The method may comprise identifying whether a user of the MCData client device is authorized. The method may comprise controlling the storage of the MCData communications based on the request message, in case of identifying that the user of the MCData client device is authorized. The method may comprise transmitting, to the MCData client device, a response message in response to the request message.

According to an embodiment of the present disclosure, a mission critical data (MCData) server for managing MCData is provided. The MCData server comprises a memory; and at least one processor coupled to the memory. The at least one processor may be configured to receive a request message for controlling a storage of MCData communications into an MCData message store from an MCData client device. The at least one processor may be configured to identify whether a user of the MCData client device is authorized. The at least one processor may be configured to control the storage of the MCData communications based on the request message, in case of identifying that the user of the MCData client device is authorized. The at least one processor may be configured to transmit, to the MCData client device, a response message in response to the request message.

According to an embodiment of the present disclosure, a method for managing mission critical data (MCData) by a MCData client device is provided. The method may comprise generating a request message for controlling a storage of MCData communications into an MCData message store. The method may comprise transmitting the request message to a MCData server. Generating the request message may comprise including a request type element set to a value of "store-comms-in-msgstore-ctrl-req" in the request message. Generating the request message may comprise including, in the request message, a store-all-private-comms-in-msgstore element set to a positive value, if a user of the MCData client device wants to store MCData private communications of the user into the MCData message store. Generating the request message may comprise including, in the request message, the store-all-private-comms-in-msgstore element set to a negative value, if the user do not want to store the MCData private communications of the user into the MCData message store. Generating the request message may comprise including, in the request message, a store-all-group-comms-in-msgstore element set to a positive value, if the user wants to store MCData group communications of the user into the MCData message store. Generating the request message may comprise including, in the request message, the store-all-group-comms-in-msgstore element set to a negative value, if the user do not want to store MCData group communications of the user into the MCData message store. Generating the request message may comprise including, in the request message, a store-specific-private-comms-in-msgstore element set to a positive value, if the user wants to store specified MCData privatie communications of the user into the MCData message store. Generating the request message may comprise including, in the request message, the store-specific-private-comms-in-msgstore element set to a negative value, if the user do not want to store the specified MCData private communications of the user into the MCData message store. Generating the request message may comprise including, in the request message, a store-specific-group-comms-in-msgstore element set to a positive value, if the user wants to store specified MCData group communications of the user into the MCData message store. Generating the request message may comprise including, in the request message, the store-specific-group-comms-in-msgstore element set to a negative value, if the user do not wants to store the specified MCData group communications of the user into the MCData message store.

According to an embodiment of the present disclosure, a mission critical data (MCData) client device for managing MCData is provided. The MCData client device may comprise a memory; and at least one processor coupled to the memory. The at least one processor may be configured to generate a request message for controlling a storage of MCData communications into an MCData message store. The at least one processor may be configured to transmit the request message to a MCData server. For generating the request message, at least one processor may be configured to include a request type element set to a value of "store-comms-in-msgstore-ctrl-req" in the request message. For generating the request message, at least one processor may be configured to include, in the request message, a store-all-private-comms-in-msgstore element set to a positivie value, if a user of the MCData client device wants to store MCData private communications of the user into the MCData message store. For generating the request message, at least one processor may be configured to include, in the request message, the store-all-private-comms-in-msgstore element set to a negative value, if the user do not want to store the MCData private communications of the user into the MCData message store. For generating the request message, at least one processor may be configured to include, in the request message, a store-all-group-comms-in-msgstore element set to a positive value, if the user wants to store MCData group communications of the user into the MCData message store. For generating the request message, at least one processor may be configured to include, in the request message, the store-all-group-comms-in-msgstore element set to a negative value, if the user do not want to store MCData group communications of the user into the MCData message store. For generating the request message, at least one processor may be configured to include, in the request message, a store-specific-private-comms-in-msgstore element set to a positive value, if the user wants to store specified MCData privatie communications of the user into the MCData message store. For generating the request message, at least one processor may be configured to include, in the request message, the store-specific-private-comms-in-msgstore element set to a negative value, if the user do not want to store the specified MCData private communications of the user into the MCData message store. For generating the request message, at least one processor may be configured to generating the request message may comprise including, in the request message, a store-specific-group-comms-in-msgstore element set to a positive value, if the user wants to store specified MCData group communications of the user into the MCData message store. For generating the request message, at least one processor may be configured to generating the request message may comprise including, in the request message, the store-specific-group-comms-in-msgstore element set to a negative value, if the user do not wants to store the specified MCData group communications of the user into the MCData message store.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF DRAWINGS

The embodiments are illustrated in the accompanying drawings, throughout which like reference letters indicate corresponding parts in the various figures. The embodiments herein will be better understood from the following description with reference to the drawings, in which:

FIG. 1 illustrates an example scenario in which a MCData communication storage handling procedure is explained, according to the embodiments as disclosed herein;

FIG. 2 illustrates an example scenario in which a MCData communication enable storage request is explained, according to the embodiments as disclosed herein;

FIG. 3 illustrates an example scenario in which a MCData communication disable storage request is explained, according to the embodiments as disclosed herein;

FIG. 4 illustrates an example scenario in which a MCData private communication storage control request is depicted, according to the embodiments as disclosed herein;

FIG. 5 illustrates an example scenario in which a MCData group communication storage control request is depicted, according to the embodiments as disclosed herein;

FIG. 6 shows various hardware components of a MCData server, according to the embodiments as disclosed herein;

FIG. 7 shows various hardware components of a MCData client device, according to the embodiments as disclosed herein;

FIG. 8 is flow chart illustrating a method, implemented by the MCData server, for controlling storage of MCData communications into a MCData message store in the MC network, according to the embodiments as disclosed herein; and FIG. 9 is flow chart illustrating a method, implemented by the MCData client device, for controlling storage of MCData communications into the MCData message store in the MC network, according to the embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The terms "MCData client device" and "MCData client" are used interchangeably in the patent disclosure.

Accordingly the embodiment herein is to provide a method for controlling storage of MCData communications into a MCData message store in a MC network. The method includes receiving, a MCData server in the MC network, a MCData communication storage control request message from a MCData client device in the MC network. Further, the method includes authorizing, by the MCData server, the MCData client device. Further, the method includes storing, by the MCData server, the MCData communication storage control request message to enable or disable storage of the MCData communications into the MCData message store based on the MCData communication storage control request message in response to successful authorization of the MCData client device. Further, the method includes sending, by the MCData server, a MCData communication storage control response message to the MCData client device.

3rd Generation Partnership Project (3GPP) TS 23.282 had defined a functional entity named a MCData message store. The MCData users to store their MCData communications permanently use a MCData message store. The MCData administrator can decide, based on the MC Service organization policy, whether the MCData user's communication shall be stored into the MCData message store or not, and accordingly the respective configuration parameters in MCData User profile document of the user is updated. Below are the parameters defined in MCData user profile document—

1. Store communication in Message Store,
2. Store private communication in Message Store, and
3. Store group communication in Message Store—This configuration is per group.

If these parameters are set, then the MCData user has the option to request whether or not to store his/her MCData communications. But currently there is no methods defined for how the MCData user can request whether to store his/her MCData communications into the MCData message store or not. The patent disclosure proposes the system and method for the MCData users that how to request a MCData server whether to store his/her MCData communications into the MCData message store account of the MCData user or not.

Referring now to the drawings and more particularly to FIGS. 1 through 9, where similar reference characters denote corresponding features consistently throughout the figures, there are shown preferred embodiments.

Controlling MCData communication storage into MCData message store—This method describes the different procedures and steps related to how the MCData user can control storing his/her MCData communication into his MCData message store account. The MCData user has the option to choose whether all his/her MCData communications (Private and specific group) will be stored or not. In particular, the MCData user has the following options:

1. Enable or disable storing his/her MCData private communications,
2. Enable or disable storing his/her MCData group communications, and
3. Enable or disable storing his/her MCData communications related to specific MCData groups.

FIG. 1 illustrates an example scenario in which a MCData communication storage handling procedure is explained, according to the embodiments as disclosed herein. Referring to the FIG. 1 consider a proposed method, illustrates the procedure of MCData communication storage control request to enable or disable storage of MCData communications by the MCData user into his MCData message store account and the details are as below:

Pre-Conditions:

1. MCData user has a valid and active MCData message store account, and
2. Configurations to store the MCData communications (private and group) into the MCData message is set Steps are as follows:

1. The MCData user at the MCData client device (100) decides to enable/disable storing his/her MCData communications into the MCData message store (101).
2. The MCData client device (100) sends the MCData communication storage control request to the MCData server (200) which carries the details based on the request from the MCData user. The MCData client device (100) and the MCData server (200) are included in the MC network (1000) (102).
3. The MCData server (200) validates whether the MCData user has valid MCData message store account and is authorized to enable or disable the storage of MCData communications (e.g., private MCData communications, group MCData communications or the like) (103).
4. The MCData server (200) stores the details of the MCData communication storage control request (104).
5. The MCData server (200) sends the MCData communication storage control response to the MCData client device (100) which indicates the success or failure of MCData communication storage control request (105).

Information flow of MCData communication storage control request is defined as below which is sent from MCData client device (100) to the MCData server (200) to enable or disable the storage of his/her MCData communications into the MCData message store account of the user. Consider the below Table (1)—

TABLE 1

| MCData communication storage control request | | |
|---|---|---|
| Information element | Status | Description |
| MC Data ID | M (Mandatory) | Identity of the requesting MC Data user |
| MCData private communication storage control (See NOTE, NOTE 2) | O (Optional) | Indicates whether to enable or disable storage of all of requesting MCData user's private MCData communication into MCData message store |
| Enable storage MCData ID list (see NOTE) | O | Indicates that the private MCData communication of requesting MCData user with these list of MCData user IDs to be stored into the MCData message store |
| Disable storage MCData ID list (See NOTE) | O | Indicates that the private MCData communication of requesting MCData user with these list of MCData user IDs to be not stored into the MCData message store |
| MCData group communication storage control (See NOTE, NOTE 1) | O | Indicates whether to enable or disable storage of all of requesting MCData user's MCData group communications into MCData message store |
| Enable storage MCData group ID list (See NOTE) | O | List of MCData group IDs whose MCData communication storage into MCData message store is to be enabled |
| Disable storage MCData group ID list (See NOTE) | O | List of MCData group IDs whose MCData communication storage into MCData message store is to be disabled |

NOTE:
At least any one of these information elements present in the request.
NOTE 1:
If this information element is present then the storage of all MCData group communications for which MCData user is authorized to store is either disabled or enabled based on the value it carries and the information elements "Enable storage MCData group ID list" and "Disable storage MCData group ID list" is ignored even if its present.
NOTE 2:
If this information element is present then the storage of all MCData private communications is either disabled or enabled based on the value it carries and the in-formation elements "Enable storage MCData ID list" and "Disable storage MCData ID list" is ignored even if its present.

Information flow of MCData communication storage control response is defined as below which is sent from MCData server (200) to the MCData client device (100). Consider the below Table (2)—

TABLE 2

| MCData communication storage control response | | |
|---|---|---|
| Information element | Status | Description |
| MC Data ID | M | Identity of the requesting MC Data user |
| Result | M | Indicates whether the enable or disable storage of MCData user's MCData communication into MCData message store is success or failure |

In other alternative embodiment the request to enable and disable the storage of MCData communications can be separated as below—

1. MCData communication enable storage request (as described in FIG. 2)
2. MCData communication disable storage request (as defined in FIG. 3)
3. MCData private communication storage control (as defined in FIG. 4)
4. MCData group communication storage control (as defined in FIG. 5)

Information flow of MCData communication enable storage request is defined as below in Table (3) which is sent from MCData client device (100) to the MCData server (200).

TABLE 3

| MCData communication enable storage request | | |
|---|---|---|
| Information element | Status | Description |
| MC Data ID | M | Identity of the requesting MC Data user |
| Enable MCData private communication (See NOTE, NOTE 2) | O | Indicates to enable storage of all of requesting MCData user's private MCData communication into MCData message store |
| Enable MCData group communication storage (See NOTE, NOTE 1) | O | Indicates to enable storage of all of requesting MCData user's MCData group communications into MCData message store |
| Enable storage MCData group ID list (See NOTE) | O | List of MCData group IDs whose MCData communication storage into MCData message store is to be enabled |

TABLE 3-continued

| MCData communication enable storage request | | |
|---|---|---|
| Information element | Status | Description |
| Enable storage MCData ID list (See NOTE, NOTE 2) | O | Indicates that the private MCData communication of this MCData user (request issuer) with these list of MCData user IDs to be stored into the MCData message store |

NOTE:
At least any one of these information elements present in the request.
NOTE 1:
If this information element is present then the storage of all MCData group communications for which MCData user is authorized to store is either disabled or enabled based on the value it carries and the information elements "Enable storage MCData group ID list" is ignored even if its present.
NOTE 2:
If this information element is present then all MCData private communication is stored in to the MCData message store and the value of the information element "Enable storage MCData ID list" is ignored if present.

Information flow of MCData communication enable storage response is defined as below which is sent from MCData server (200) to the MCData client device (100). Consider the below Table (4)—

TABLE 4

| MCData communication enable storage response | | |
|---|---|---|
| Information element | Status | Description |
| MC Data ID | M | Identity of the requesting MC Data user |
| Result | M | Indicates whether the enable storage of MCData user's MCData communication into MCData message store is success or failure |

Information flow of MCData communication disable storage request is defined as below in Table (5) which is sent from MCData client device (100) to the MCData server (200).

TABLE 5

| MCData communication disable storage request | | |
|---|---|---|
| Information element | Status | Description |
| MC Data ID | M | Identity of the requesting MC Data user |
| Disable MCData private communication storage control (See NOTE, NOTE 2) | O | Indicates to disable storage of all of requesting MCData user's private MCData communication into MCData message store |
| Disable MCData group communication storage (See NOTE, NOTE 1) | O | Indicates to disable storage of all of requesting MCData user's MCData group communications into MCData message store |
| Disable storage MCData group ID list (See NOTE) | O | List of MCData group IDs whose MCData communication storage into MCData message store is to be disabled |
| Disable storage MCData ID list (See NOTE, NOTE 2) | O | Private MCData communication of this MCData user (request issuer) with these list of MCData user IDs to be not stored into the MCData message store |

NOTE:
At least any one of these information elements present in the request.
NOTE 1:
If this information element is present then the storage of all MCData group communications for which MCData user is authorized to store is disabled and the in-formation elements "Disable storage MCData group ID list" is ignored even if its present.
NOTE 2:
If this information element is present then all MCData private communication is stored in to the MCData message store and the value of the information element "Enable storage MCData ID list" is ignored if present.

Information flow of MCData communication disable storage response is defined as below Table (6) which is sent from MCData server (200) to the MCData client device (100).

TABLE 6

| MCData communication disable storage response | | |
|---|---|---|
| Information element | Status | Description |
| MC Data ID | M | Identity of the requesting MC Data user |
| Result | M | Indicates whether the disable storage of MCData user's MCData communication into MCData message store is success or failure |

Information flow of MCData private communication storage control request is defined as below Table (7) which is sent from MCData client device (100) to the MCData server (200).

TABLE 7

| MCData private communication storage control request | | |
|---|---|---|
| Information element | Status | Description |
| MC Data ID | M | Identity of the requesting MC Data user |
| MCData private communication storage control (See NOTE, NOTE 1) | O | Indicates whether to enable or disable storage of all of requesting MCData user's private MCData communication into MCData message store |
| Enable storage MCData ID list (see NOTE) | O | Indicates that the private MCData communication of requesting MCData user with these list of MCData user IDs to be stored into the MCData message store |
| Disable storage MCData ID list (See NOTE) | O | Indicates that the private MCData communication of requesting MCData user with these list of MCData user IDs to be not stored into the MCData message store |

NOTE:
At least any one of these information elements present in the request.
NOTE 1:
If this information element is present then the storage of all MCData private communications is either disabled or enabled based on the value it carries and the in-formation elements "Enable storage MCData ID list" and "Disable storage MCData ID list" is ignored even if its present.

Information flow of MCData private communication storage control response is defined as below Table (8) which is sent from MCData server (200) to the MCData client device (100).

TABLE 8

| MCData private communication storage control response | | |
|---|---|---|
| Information element | Status | Description |
| MC Data ID | M | Identity of the requesting MC Data user |
| Result | M | Indicates whether the enable or disable storage of MCData user's private MCData communication into MCData message store is success or failure |

Information flow of MCData communication storage control request is defined as below which is sent from MCData client device (100) to the MCData server (200) to enable or disable the storage of his/her MCData group communications into the MCData message store account of the user. Consider a below Table (9)—

TABLE 9

| MCData group communication storage control request | | |
|---|---|---|
| Information element | Status | Description |
| MC Data ID | M | Identity of the requesting MC Data user |
| MCData group communication storage control (See NOTE, NOTE 1) | O | Indicates whether to enable or disable storage of all of requesting MCData user's MCData group communications into MCData message store |
| Enable storage MCData group ID list (See NOTE) | O | List of MCData group IDs whose MCData communication storage into MCData message store is to be enabled |

TABLE 9-continued

| MCData group communication storage control request | | |
|---|---|---|
| Information element | Status | Description |
| Disable storage MCData group ID list (See NOTE) | O | List of MCData group IDs whose MCData communication storage into MCData message store is to be disabled |

NOTE:
At least any one of these information elements present in the request.
NOTE 1:
If this information element is present then the storage of all MCData group communications for which MCData user is authorized to store is either disabled or enabled based on the value it carries and the information elements "Enable storage MCData group ID list" and "Disable storage MCData group ID list" is ignored even if its present.

Information flow of MCData communication storage control response is defined as below Table (10) which is sent from MCData server (200) to the MCData client. device (100)

TABLE 10

| MCData group communication storage control response | | |
|---|---|---|
| Information element | Status | Description |
| MC Data ID | M | Identity of the requesting MC Data user |
| Result | M | Indicates whether the enable or disable storage of MCData user's MCData group communication into MCData message store is success or failure |

FIG. 2 illustrates an example scenario in which a MCData communication enable storage request is explained, according to the embodiments as disclosed herein. Referring to the FIG. 2 consider a proposed method, illustrates the procedure of MCData communication enable storage request to enable storage of MCData communications by the MCData user into his MCData message store account and the details. Pre-conditions are as follows—

1. MCData user has a valid and active MCData message store account, and
2. Configurations to store the MCData communications (private and group) into the MCData message is set Steps are as follows—

1. The MCData user at the MCData client device (100) decides to enable storing his/her MCData communications into the MCData message store (201).
2. The MCData client device (100) sends the MCData communication enable storage request to the MCData server (200) which carries the details based on the request from the MCData user (202).
3. The MCData server (200) validates whether the MCData user has valid MCData message store account and is authorized to enable the storage of MCData communications (Private and which group) (203).
4. The MCData server (200) stores the details of the MCData communication storage control request (204).
5. The MCData server (200) sends the MCData communication enable storage response to the MCData client device (100) which indicates the success or failure of MCData communication enable storage request (205).

FIG. 3 illustrates an example scenario in which a MCData communication disable storage request is explained, according to the embodiments as disclosed herein. Referring to the FIG. 3 consider a proposed method, illustrates the procedure of MCData communication disable storage request to disable storage of MCData communications by the MCData user into his MCData message store account and the details. Pre-conditions are as follows—

1. MCData user has a valid and active MCData message store account, and
2. Configurations to store the MCData communications (private and group) into the MCData message is set Steps are as follows—

1. The MCData user at the MCData client device (100) decides to disable storing his/her MCData communications into the MCData message store (301).
2. The MCData client device (100) sends the MCData communication disable storage request to the MCData server (200) which carries the details based on the request from the MCData user (302).
3. The MCData server (200) validates whether the MCData user has valid MCData message store account and is authorized to disable the storage of MCData communications (Private and which group) (303).
4. The MCData server (200) stores the details of the MCData communication storage control request (304).
5. The MCData server (200) sends the MCData communication disable storage response to the MCData client device (100) which indicates the success or failure of MCData communication disable storage request (305).

When the MCData server (200) receives the request from MCData client device (100) to enable or disable the storage of MCData communications into the MCData message store account of the MCData user, it retains the details of this request until further explicitly updated by the MCData client device (100). The corresponding data will be retained across login cycles.

FIG. 4 illustrates an example scenario in which a MCData private communication storage control request is depicted, according to the embodiments as disclosed herein.

Referring to the FIG. 4 consider a proposed method, illustrates the procedure of MCData private communication storage control request to enable or disable storage of MCData private communications by the MCData user into his MCData message store account and the details. Pre-conditions are as follows—

1. MCData user has a valid and active MCData message store account
2. Configurations to store the MCData private communications into the MCData message is set Steps are as follows—

1. The MCData user at the MCData client device (100) decides to enable or disable storing his/her MCData private communications into the MCData message store (401).
2. The MCData client device (100) sends the MCData private communication storage control request to the MCData server (200) which carries the details based on the request from the MCData user (402).
3. The MCData server (200) validates whether the MCData user has valid MCData message store account and is authorized to store his MCData private communications (403).
4. The MCData server (200) stores the details of the MCData communication storage control request (404).
5. The MCData server (200) sends the MCData private communication storage control response to the MCData client device (100) which indicates the success or failure of MCData private communication storage control request (405).

FIG. 5 illustrates an example scenario in which a MCData group communication storage control request is depicted, according to the embodiments as disclosed herein. Referring to the FIG. 5 consider a proposed method, illustrates the procedure of MCData group communication storage control request to enable or disable storage of MCData group communications by the MCData user into his MCData message store account and the details. Pre-conditions are as follows—

1. MCData user has a valid and active MCData message store account
2. Configurations to store the MCData group communications into the MCData message is set for all or some of his groups.

Steps are as follows—

1. The MCData user at the MCData client device (100) decides to enable or disable storing his/her MCData private group into the MCData message store (501).
2. The MCData client device (100) sends the MCData group communication storage control request to the MCData server (200) which carries the details based on the request from the MCData user (502).
3. The MCData server (200) validates whether the MCData user has valid MCData message store account and is authorized to store his MCData group communications (503).
4. The MCData server (200) stores the details of the MCData communication storage control request (504).
5. The MCData server (200) sends the MCData group communication storage control response to the MCData client device (100) which indicates the success or failure of MCData group communication storage control request (505).

The detailed implementation of how to enable or disable the storage of MCData communication storage is described as below. The request sip method MESSAGE is used for carrying the information and alternatively the user can use any other sip method messages.

Further, the proposed method provides the following changes to the MCData User profile configuration document (TS 24.484 Clause 10.3.2).

The < > element may include <allow-store-comms-in-msgstore> that indicates whether the storage of MCData communications into the MCData message store is enabled or not, and whether user can request to store selected or all of his/her MCData communication into the MCData message store.

The <mcdata-user-profile> element may include <allow-store-private-comms-in-msgstore> that indicates whether user can request to store his/her mcdata private communications into the MCData message store or not.

The <MCDataGroupInfo> is extended to contain the child element <allow-store-group-comm-in-msgstore> which indicates whether the MCData user is allowed to request to store the group communication of the MCData group specified in the <MCDataGroupInfo> into the MCData message store account of the user. Each MCData Group corresponding to <MCDataGroupInfo> element may include<allow-store-group-comm-in-msgstore> element.

Further, the proposed method provides a new schema for application/vnd.3gpp.mcdata-msgstore-ctrl-request+xml is defined as below for MCData signaling control protocol specification document (TS 24.282).

```
<? xml version="1.0" encoding="UTF-8"?>
<xs:schema xmlns:xs="http://www.w3.org/2001/XMLSchema"
targetNamespace="urn:3gpp:ns:msgstoreControlRequest:1.0"
xmlns:mcpttmsgstorectrl="urn:3gpp:ns:msgstoreControlRequest:1.0"
```

```
attributeFormDefault="unqualified"
  elementFormDefault="qualified">
<xs:complexType name="enable-command">
<xs:sequence>
<xs:element type="xs:anyURI" name="group"
  minOccurs="0"maxOccurs="unbounded"/>
<xs:element type="xs:anyURI" name="private" minOccurs="0" maxOccurs="unbounded"/>
<xs:any namespace="##other" processContents="lax"
  minOccurs="0" maxOccurs="unbounded"/>
<xs:element name="anyExt" type="mcpttmsgstorectrl:
  anyExtType" minOccurs="0"/>
</xs:sequence>
<xs:any Attribute namespace="##any"
  processContents="lax"/>
</xs:complexType>
<xs:complexType name="disable-command">
<xs:sequence>
<xs:element type="xs:anyURI" name="group" minOccurs="0" maxOccurs="unbounded"/>
<xs:element type="xs:anyURI" name="private" minOccurs="0" maxOccurs="unbounded"/>
<xs:any namespace="##other" processContents="lax"
  minOccurs="0" maxOccurs="unbounded"/>
<xs:element name="anyExt" type="mcpttmsgstorectrl:
  anyExtType" minOccurs="0"/>
</xs:sequence>
<xs:any Attribute namespace="##any"
  processContents="lax"/>
</xs:complexType>
<!--root XML element when creating a message store
  XML document-->
<xs:element name="msgstore-ctrl-command-list">
<xs:complexType>
<xs:sequence>
<xs:element name="enable" type="mcpttmsgstorectrl:
  enable-command" minOccurs="0" maxOccurs="1"/>
<xs:element name="disable" type="mcpttmsgstorectrl:
  disable-command" minOccurs="0" maxOccurs="1"/>
<xs:element name="anyExt" type="mcpttmsgstorectrl:
  anyExtType" minOccurs="0"/>
<xs:any namespace="##other" processContents="lax"
  minOccurs="0" maxOccurs="unbounded"/>
</xs:sequence>
</xs:complexType>
</xs:element>
<xs:complexType name="anyExtType">
<xs:sequence>
<xs:any namespace="##any" processContents="lax"
  minOccurs="0" maxOccurs="unbounded"/>
</xs:sequence>
</xs:complexType>
</xs:schema>
```

The <msgstore-ctrl-command-list> element is the root element of the XML document. The <msgstore-ctrl-command-list> element may contain <enable>, or <disable> subelements or both.

A. If the <msgstore-ctrl-command-list> contains the <enable> element then—

1. The <enable> element contains a list of <group> sub elements having one or more sub element. The recipient shall enable the storing of the communications into message store of all the MCData groups contained in the list for the clients for which the <msgstore-ctrl-command-list> applies.
2. The <enable> element contains a list of <private> sub elements having one or more sub element. The recipient shall enable the storing of the communications into message store of all the MCData IDs contained in the list for the clients for which the <msgstore-ctrl-command-list> applies.

B. If the <msgstore-ctrl-command-list> contains the <disable> element then:

1. The <disable> element contains a list of <group> subelements having one or more subelement. The recipient shall disable the storing of the communications into message store of all the MCData groups contained in the list for the clients for which the <msgstore-ctrl-command-list> applies.
2. The <disable> element contains a list of <private> subelements having one or more subelement. The recipient shall disable the storing of the communications into message store of all the MCData IDs contained in the list for the clients for which the <msgstore-ctrl-command-list> applies.

The recipient of the XML ignores any unknown element and any unknown attribute.

Further, the proposed method provides following changes to the MCData signaling control protocol specification document (TS 24.282).

1. MCData private communications storage control request to enable
2. MCData group communications storage control request enable
3. MCData private communications storage control request to disable and
4. MCData group communications storage control request disable SIP MESSAGE request: The MCData server (200) needs to distinguish between the following SIP MESSAGE request for originations and terminations.

SIP MESSAGE requests routed to the participating MCData function as a result of initial filter criteria with the Request-URI set to the public service identity of the participating MCData function and containing a Content-Type header field set to "application/vnd.3gpp.mcdata-info+xml" and including an XML body containing a <mcdatainfo> root element containing a <mcdata-Params> element containing an <anyExt> element with the <request-type> element set to a value of "store-private-comms-in-msgstore-ctrl-req" or "store-group-comms-in-msgstore-ctrl-req". Such requests are known as "SIP MESSAGE request for controlling the storage of the MCData communications into MCData message store".

Warning texts—Table below defines the warning texts that are defined for the Warning header field when a Warning header field is included in a response to a SIP MESSAGE request for enabling or disabling the storage of MCData communication storage control request.

TABLE 11

| Code | Explanatory text | Description |
|---|---|---|
| xyz | user not authorized to request for enabling or disabling the storage of MCData communications into the MCData message store | The function is not allowed to this user. |
| abc | unable to determine target user or groupfor enabling or disabling the storage of MCData communications into the MCData message store | The MCData server is unable to determine the targeted user or group for enabling or disabling of the storage of MCData communications |

On request from MCData user at MCData client device (100), a request to control (i.e. to enable or disable) the storage of MCData communication into the MCData message store is initiated to the participating MCData function.

MCData private communications storage control request to enable storage—Upon receiving a request from the MCData user to send a request to control (i.e., enable) the storage of MCData communications request, if the <allow-store-comms-in-msgstore> element of the <ruleset> element is not present in the MCData user profile document (see the MCData user profile document in 3GPP TS 24.484) or is set to a value of "false", the MCData client device (100) shall inform the MCData user and shall exit this procedure.

Upon receiving a request from the MCData user to send a request to enable the storage of MCData private communications, the MCData client device (100) shall generate a SIP MESSAGE request in accordance with 3GPP TS 24.229 and IETF RFC 3428 with the clarifications given below. The MCData client device (100):

1. shall include a Request-URI set to the public service identity identifying the originating participating MCData function serving the MCData user;
2. shall include the ICSI value "urn:urn-7:3gpp-service-.ims.icsi.mcdata" (coded as specified in 3GPP TS 24.229), in a P-Preferred-Service header field according to IETF RFC 6050;
3. shall include an Accept-Contact header field with the g.3gpp.icsi-ref media feature tag containing the value of "urn:urn-7:3gpp-service.ims.icsi.mcdata" along with the "require" and "explicit" header field parameters according to IETF RFC 3841;
4. may include a P-Preferred-Identity header field in the SIP MESSAGE request containing a public user identity as specified in 3GPP TS 24.229;
5. shall include an application/vnd.3gpp.mcdata-info+xml MIME body as specified in clause D.1 with the <mcdatainfo> element containing the <mcdata-Params> element with:
   a. the <request-type> element set to a value of "store-private-comms-in-msgstore-ctrl-req";
   b. if user want to store all of his/her MCData private communications with other users for which user is authorized to store into MCData message store account, and if requested to store the communications, shall include<store-all-comms-in-msgstore> element set to a value of "true"; (or)
   c. if user want to store his/her MCData private communications with selected users for which user is authorized to store into MCData message store account, and if requested to store the communications, shall include<store-specific-comms-in-msgstore>element set to a value of "enable";
   d. the <mcdata-client-id>element set to the MCData client ID of the originating MCData client device (100); and
   e. if the MCData client device (100) needs to include an active functional alias in the SIP MESSAGE request, the <functional-alias-URI> set to the URI of the used functional alias;
6. if the <store-specific-comms-in-msgstore>element is included in an application/vnd.3gpp.mcdata-info+xml MIME body, shall include an application/resource-lists+xml MIME body with one or more <entry> elements containing a "uri" attribute set to an MCData ID of the MCData users; and
7. shall send the SIP MESSAGE request according to rules and procedures of 3GPP TS 24.229.

MCData private communications storage control request to disable storage—Upon receiving a request from the MCData user to send a request to control (i.e., disable) the storage of MCData communications request, if the <allow-store-comms-in-msgstore> element of the <ruleset> element is not present in the MCData user profile document (see the MCData user profile document in 3GPP TS 24.484) or is set to a value of "false", the MCData client device (100) shall inform the MCData user and shall exit this procedure.

Upon receiving a request from the MCData user to send a request to disable the storage of MCData private communications, the MCData client device (100) shall generate a SIP MESSAGE request in accordance with 3GPP TS 24.229 and IETF RFC 3428 with the clarifications given below. The MCData client device (100):

1. shall include a Request-URI set to the public service identity identifying the originating participating MCData function serving the MCData user;
2. shall include the ICSI value "urn:urn-7:3gpp-service-.ims.icsi.mcdata" (coded as specified in 3GPP TS 24.229), in a P-Preferred-Service header field according to IETF RFC 6050;
3. shall include an Accept-Contact header field with the g.3gpp.icsi-ref media feature tag containing the value of "urn:urn-7:3gpp-service.ims.icsi.mcdata" along with the "require" and "explicit" header field parameters according to IETF RFC 3841;
4. may include a P-Preferred-Identity header field in the SIP MESSAGE request containing a public user identity as specified in 3GPP TS 24.229;
5. shall include an application/vnd.3gpp.mcdata-info+xml MIME body as specified in clause D.1 with the <mcdatainfo> element containing the <mcdata-Params> element with:
   a. the <request-type>element set to a value of "store-private-comms-in-msgstore-ctrl-req";
   b. if user do not want to store all of his/her MCData private communications with other users for which user is authorized to store into MCData message store account, and if requested not to store the communications, shall include<store-all-comms-in-msgstore> element set to a value of "false"; (or)

c. if user do want to store his/her MCData private communications with selected users for which user is authorized to store into MCData message store account, and if requested not to store the communications, shall include<store-specific-comms-in-msgstore>element set to a value of “disable”;

d. the <mcdata-client-id> element set to the MCData client ID of the originating MCData client device (100); and e. if the MCData client device (100) needs to include an active functional alias in the SIP MESSAGE request, the <functional-alias-URI> set to the URI of the used functional alias;

6. if the <store-specific-comms-in-msgstore>element is included in an application/vnd.3gpp.mcdata-info+xml MIME body, shall include an application/resource-lists+xml MIME body with one or more <entry>elements containing a “uri” attribute set to an MCData ID of the MCData users; and 7. shall send the SIP MESSAGE request according to rules and procedures of 3GPP TS 24.229.

MCData Group communications storage control request to enable storage—Upon receiving a request from the MCData user to send a request to control (i.e., enable) the storage of MCData group communications request, if the <allow-store-comms-in-msgstore> element of the <ruleset> element is not present in the MCData user profile document (see the MCData user profile document in 3GPP TS 24.484) or is set to a value of “false”, the MCData client device (100) shall inform the MCData user and shall exit this procedure.

Upon receiving a request from the MCData user to send a request to enable the storage of MCData group communications, the MCData client device (100) shall generate a SIP MESSAGE request in accordance with 3GPP TS 24.229 and IETF RFC 3428 with the clarifications given below. The MCData client device (100):

1. shall include a Request-URI set to the public service identity identifying the originating participating MCData function serving the MCData user;

2. shall include the ICSI value “urn:urn-7:3gpp-service.ims.icsi.mcdata” (coded as specified in 3GPP TS 24.229), in a P-Preferred-Service header field according to IETF RFC 6050;

3. shall include an Accept-Contact header field with the g.3gpp.icsi-ref media feature tag containing the value of “urn:urn-7:3gpp-service.ims.icsi.mcdata” along with the “require” and “explicit” header field parameters according to IETF RFC 3841;

4. may include a P-Preferred-Identity header field in the SIP MESSAGE request containing a public user identity as specified in 3GPP TS 24.229;

5. shall include an application/vnd.3gpp.mcdata-info+xml MIME body as specified in clause D.1 with the <mcdatainfo> element containing the <mcdata-Params> element with:

a. the <request-type> element set to a value of “store-group-comms-in-msgstore-ctrl-req”;

b. if user want to store all of his/her MCData group communications for which user is authorized to store into MCData message store account, and if requested to store the communications, shall include<store-all-comms-in-msgstore>element set to a value of “true”; (or)

c. if user want to store his/her MCData group communications of selected MCData groups for which user is authorized to store into MCData message store account, and if requested to store the communications, shall include<store-specific-comms-in-msgstore>element set to a value of “enable”;

d. the <mcdata-client-id> element set to the MCData client ID of the originating MCData client device (100); and e. if the MCData client device (100) needs to include an active functional alias in the SIP MESSAGE request, the <functional-alias-URI> set to the URI of the used functional alias;

6. if the <store-specific-comms-in-msgstore> element is included in an application/vnd.3gpp.mcdata-info+xml MIME body, shall include an application/resource-lists+xml MIME body with one or more <entry> elements containing a “uri” attribute set to an MCData group ID; and 7. shall send the SIP MESSAGE request according to rules and procedures of 3GPP TS 24.229.

MCData Group communications storage control request to disable storage—Upon receiving a request from the MCData user to send a request to control (i.e., disable) the storage of MCData group communications request, if the <allow-store-comms-in-msgstore> element of the <ruleset> element is not present in the MCData user profile document (see the MCData user profile document in 3GPP TS 24.484) or is set to a value of “false”, the MCData client device (100) shall inform the MCData user and shall exit this procedure.

Upon receiving a request from the MCData user to send a request to disable the storage of MCData group communications, the MCData client device (100) shall generate a SIP MESSAGE request in accordance with 3GPP TS 24.229 and IETF RFC 3428 with the clarifications given below. The MCData client device (100)—

1. shall include a Request-URI set to the public service identity identifying the originating participating MCData function serving the MCData user;

2. shall include the ICSI value “urn:urn-7:3gpp-service.ims.icsi.mcdata” (coded as specified in 3GPP TS 24.229), in a P-Preferred-Service header field according to IETF RFC 6050;

3. shall include an Accept-Contact header field with the g.3gpp.icsi-ref media feature tag containing the value of “urn:urn-7:3gpp-service.ims.icsi.mcdata” along with the “require” and “explicit” header field parameters according to IETF RFC 3841;

4. may include a P-Preferred-Identity header field in the SIP MESSAGE request containing a public user identity as specified in 3GPP TS 24.229;

5. shall include an application/vnd.3gpp.mcdata-info+xml MIME body as specified in clause D.1 with the <mcdatainfo> element containing the <mcdata-Params> element with:

a. the <request-type>element set to a value of “store-group-comms-in-msgstore-ctrl-req”;

b. if user do not want to store all of his/her MCData group communications for which user is authorized to store into MCData message store account, and if requested not to store the communications, shall include<store-all-comms-in-msgstore>element set to a value of “false”; (or)

c. if user do not want to store his/her MCData group communications of selected MCData groups for which user is authorized to store into MCData message store account, and if requested not to store the communications, shall include<store-specific-comms-in-msgstore>element set to a value of “disable”;

d. the <mcdata-client-id>element set to the MCData client ID of the originating MCData client device (100); and e. if the MCData client device (100) needs to include an active functional alias in the SIP MESSAGE request, the <functional-alias-URI> set to the URI of the used functional alias;

6. if the <store-specific-comms-in-msgstore>element is included in an application/vnd.3gpp.mcdata-info+xml MIME body, shall include an application/resource-lists+xml MIME body with one or more <entry> elements containing a "uri" attribute set to an MCData group ID; and 7. shall send the SIP MESSAGE request according to rules and procedures of 3GPP TS 24.229.

The participating MCData function has procedures to receive a control MCData communications storage request from the MCData client device (100).

Control MCData communication storage request—Upon receipt of a "SIP MESSAGE request for controlling the storage of the MCData communications into MCData message store", the participating MCData function—

1. if unable to process the request due to a lack of resources or a risk of congestion exists, may reject the SIP MESSAGE request with a SIP 500 (Server Internal Error) response. The participating MCData function may include a Retry-After header field to the SIP 500 (Server Internal Error) response as specified in IETF RFC 3261 and skip the rest of the steps;

2. shall determine the MCData ID of the calling user from the public user identity in the P-Asserted-Identity header field of the SIP MESSAGE request;

a. The MCData ID of the calling user is bound to the public user identity at the time of service authorisation.

3. if the participating MCData function cannot find a binding between the public user identity and an MCData ID or if the validity period of an existing binding has expired, then the participating MCData function shall reject the SIP MESSAGE request with a SIP 404 (Not Found) response with the warning text set to "141 user unknown to the participating function" in a Warning header field and shall not continue with any of the remaining steps;

4. if the <request-type> element in the application/vnd.3gpp.mcdata-info+xml MIME body of the SIP MESSAGE request is set to a value of "store-private-comms-in-msgstore-ctrl-req" and:

a. the <allow-store-comms-in-msgstore> element of the <ruleset> element is not present in the MCData user profile document (see the MCData user profile document in 3GPP TS 24.484) or is set to a value of "false", shall reject the SIP MESSAGE request with a SIP 403 (Forbidden) response including warning text set to "xyz user not authorized to request for enabling or disabling the storage of MCData communications into the MCData message store" in a Warning header field, and shall not continue with the rest of the steps in this subclause;

b. the <allow-store-private-comms-in-msgstore> element of the <ruleset> element is not present in the MCData user profile document (see the MCData user profile document in 3GPP TS 24.484) or is set to a value of "false", shall reject the SIP MESSAGE request with a SIP 403 (Forbidden) response including warning text set to "xyz user not authorized to request for enabling or disabling the storage of MCData communications into the MCData message store" in a Warning header field, and shall not continue with the rest of the steps in this subclause;

c. the SIP MESSAGE request do not contain an application/resource-lists MIME body and the <store-all-comms-in-msgstore> element in the application/vnd.3gpp.mcdata-info+xml MIME body, shall reject the SIP MESSAGE request with a SIP 403 (Forbidden) response including warning text set to "abc unable to determine target user or group for enabling or disabling the storage of MCData communications into the MCData message store" in a Warning header field, and shall not continue with the rest of the steps in this subclause; (or)

d. if the <store-specific-comms-in-msgstore>is present and the request do not contain an application/resource-lists MIME body, shall reject the SIP MESSAGE request with a SIP 403 (Forbidden) response including warning text set to "abc unable to determine target user or group for enabling or disabling the storage of MCData communications into the MCData message store" in a Warning header field, and shall not continue with the rest of the steps in this subclause;

5. if the <request-type> element in the application/vnd.3gpp.mcdata-info+xml MIME body of the SIP MESSAGE request is set to a value of "store-group-comms-in-msgstore-ctrl-req" and:

a. the <allow-store-comms-in-msgstore> element of the <ruleset> element is not present in the MCData user profile document (see the MCData user profile document in 3GPP TS 24.484) or is set to a value of "false", shall reject the SIP MESSAGE request with a SIP 403 (Forbidden) response including warning text set to "xyz user not authorized to request for enabling or disabling the storage of MCData communications into the MCData message store" in a Warning header field, and shall not continue with the rest of the steps in this subclause;

b. the <allow-store-group-comm-in-msgstore>element of the each <MCDataGroupInfo> element is not present in the MCData user profile document (sec the MCData user profile document in 3GPP TS 24.484) or is set to a value of "false", shall reject the SIP MESSAGE request with a SIP 403 (Forbidden) response including warning text set to "xyzuser not authorized to request for enabling or disabling the storage of MCData communications into the MCData message store" in a Warning header field, and shall not continue with the rest of the steps in this subclause;

c. the SIP MESSAGE request do not contain an application/resource-lists MIME body and the <store-all-comms-in-msgstore> element in the application/vnd.3gpp.mcdata-info+xml MIME body, shall reject the SIP MESSAGE request with a SIP 403 (Forbidden) response including warning text set to "abcunable to determine target user or group for enabling or disabling the storage of MCData communications into the MCData message store" in a Warning header field, and shall not continue with the rest of the steps in this subclause;

d. if the <store-all-comms-in-msgstore> element is not present and an application/resource-lists MIME body with one or more <entry> elements included, then each specified MCPTT group ID matches with the corresponding entry in the each <MCDataGroupInfo> and do not contain the <allow-store-group-comm-in-msgstore> element in the MCData user profile document (see the MCData user profile document in 3GPP TS 24.484) or is set to a value of "false", shall reject the SIP MESSAGE request with a SIP 403 (Forbidden)

response including warning text set to "xyz user not authorized to request for enabling or disabling the storage of MCData communications into the MCData message store" in a Warning header field, and shall not continue with the rest of the steps in this subclause; or e. if the <store-specific-comms-in-msgstore> is present and the request do not contain an application/resource-lists MIME body, shall reject the SIP MESSAGE request with a SIP 403 (Forbidden) response including warning text set to "abc unable to determine target user or group for enabling or disabling the storage of MCData communications into the MCData message store" in a Warning header field, and shall not continue with the rest of the steps in this subclause;

6. if the application/vnd.3gpp.mcdata-info+xml MIME body of the SIP MESSAGE request contains the <request-type> element set to a value of "store-private-comms-in-msgstore-ctrl-req and:

a. if the <store-all-comms-in-msgstore> element set to a value of "true", shall update or store the record for the MCData client device (100) and enable the storage of all the MCData private communications for which user is authorized to store the communication into the MCData message store;

b. if the <store-all-comms-in-msgstore> element set to a value of "false", shall update or store the record for the MCData client device (100) and disable the storage of all the MCData private communications for which user is authorized to store the communication into the MCData message store;

c. if the <store-specific-comms-in-msgstore> element set to a value of "enable", the <store-all-comms-in-msgstore> element is not present and an application/resource-lists MIME body with one or more <entry> elements included, shall update or store the record for the MCData client device (100) and enable the storage of MCData private communications with specific set of users for which user is authorized to store the communication into the MCData message store; or d. if the <store-specific-comms-in-msgstore>element set to a value of "disable", the <store-all-comms-in-msgstore> element is not present and an application/resource-lists MIME body with one or more <entry> element included, shall update or store the record for the MCData client device (100) and disable the storage of MCData private communications with specific set of users for which user is authorized to store the communication into the MCData message store;

7. if the application/vnd.3gpp.mcdata-info+xml MIME body of the SIP MESSAGE request contains the <request-type> element set to a value of "store-group-comms-in-msgstore-ctrl-req and:

a. if the <store-all-comms-in-msgstore> element set to a value of "true", shall update or store the record for the MCData client device (100) and enable the storage of all the MCData group communications for which user is authorized to store the communication into the MCData message store;

b. if the <store-all-comms-in-msgstore> element set to a value of "false", shall update or store the record for the MCData client device (100) and disable the storage of all the MCData group communications for which user is authorized to store the communication into the MCData message store;

c. if the <store-specific-comms-in-msgstore> element set to a value of "enable", the <store-all-comms-in-msgstore> element is not present and an application/resource-lists MIME body with one or more <entry> element included, then the MCData participating function shall update or store the record for the MCData client device (100) and enable the storage for the specified MCData group communications for which user is authorized to store the communication into the MCData message store; or d. if the <store-specific-comms-in-msgstore> element set to a value of "disable", the <store-all-comms-in-msgstore> element is not present and an application/resource-lists MIME body with one or more <entry> element included, then the MCData participating function shall update or store the record for the MCData client device (100) and disable the storage for the specified MCData group communications for which user is authorized to store the communication into the MCData message store;

8. shall generate a SIP 200 (OK) response as specified in 3GPP TS 24.229 with the follow clarifications:

a. shall include the public user identity in the P-Asserted-Identity header;

9. shall send the SIP 200 (OK) response to the MCData client device (100) according to 3GPP TS 24.229.

The existing <mcdata> element of mcdata info xml is extended to include two new parameters.

If the <mcdatainfo> contains the <mcdata-Params> element then:

1. the <anyExt> can be included with the following elements not declared in the XML schema:

a. a <request-type> of type "xs:string":

i. set to value of "store-private-comms-in-msgstore-ctrl-req" when a mcdata client device (100) initiates a request to control the storage of MCData private communications into MCData message store;

ii. set to value of "store-group-comms-in-msgstore-ctrl-req" when a mcdata client device (100) initiates a request to control the storage of MCData private communications into MCData message store;

b. a <store-all-comms-in-msgstore> of type "xs:boolean":

i. set to a value of "true" when the user wants to store his/her MCData private/group communications into his/her MCData message store account; or ii. set to a value of "false" when the user do not store his/her MCData private/group communications into his/her MCData message store account;

c. a <store-specific-comms-in-msgstore> of type "xs:string":

i. set to a value of "enable" when the user wants to store the specified MCData private/group communications for which user is authorized to store the communication into the MCData message store; or ii. set to a value of "disable" when the user do not wants to store the specified MCData private/group communications for which user is authorized to store the communication into the MCData message store;

As an alternate, the list of MCData ID or MCData Group ID can be specified by using new schema to enable and disable list for each private and group communications.

The step 6) of "MCData private communications storage control request to enable storage" in above procedure is re-written as below.

6. if the <store-specific-comms-in-msgstore>element is included in an application/vnd.3gpp.mcdata-info+xml MIME body, shall include an application/vnd.3gpp.mcdata-msgstore-ctrl-request+xml MIME body containing with:

a. if the <store-specific-comms-in-msgstore>element set to a value of "enable", may include one or more <private> elements of <enable> element containing aMCData ID of the MCData user;

The step 6) of "MCData Group communications storage control request to enable storage" in above procedure is re-written as below.

6. if the <store-specific-comms-in-msgstore>element is included in an application/vnd.3gpp.mcdata-info+xml MIME body, shall include an application/vnd.3gpp.mcdata-msgstore-ctrl-request+xml MIME body containing with:

a. if the <store-specific-comms-in-msgstore>element set to a value of "enable", may include one or more <group> elements of <enable> element containing a MCData Group ID;

The step 6) of "MCData private communications storage control request to disable storage" in above procedure is re-written as below.

6. if the <store-specific-comms-in-msgstore>element is included in an application/vnd.3gpp.mcdata-info+xml MIME body, shall include an application/vnd.3gpp.mcdata-msgstore-ctrl-request+xml MIME body containing with:

a. if the <store-specific-comms-in-msgstore>element set to a value of "disable", may include one or more <private> elements of <disable> element containing a MCData ID of the MCData user;

The step 6) of "MCData Group communications storage control request to enable storage" in above procedure is re-written as below.

6. if the <store-specific-comms-in-msgstore>element is included in an application/vnd.3gpp.mcdata-info+xml MIME body, shall include an application/vnd.3gpp.mcdata-msgstore-ctrl-request+xml MIME body containing with:

a. if the <store-specific-comms-in-msgstore>element set to a value of "disable", may include one or more <group> elements of <disable> element containing a MCData Group ID;

In another embodiments, some of the solutions are provided here—

2. MCData private/group communications storage control request to enable
3. MCData private/group communications storage control request to disable In an alternate proposal, the standalone request carry both the private and group communications related storage control indication explicitly for enabling storage of the communications into message store. Similarly, the standalone request carry both the private and group communications related storage control indication explicitly for disabling storage of the communications into message store.

SIP MESSAGE request: The MCData server (200) needs to distinguish between the following SIP MESSAGE request for originations and terminations.

SIP MESSAGE requests routed to the participating MCData function as a result of initial filter criteria with the Request-URI set to the public service identity of the participating MCData function and containing a Content-Type header field set to "application/vnd.3gpp.mcdata-info+xml" and including an XML body containing a <mcdatainfo> root element containing a <mcdata-Params> element containing an <anyExt> element with the <request-type> element set to a value of "store-comms-in-msgstore-ctrl-req". Such requests are known as "SIP MESSAGE request for controlling the storage of the MCData communications into MCData message store".

Warning texts—Table below defines the warning texts that are defined for the Warning header field when a Warning header field is included in a response to a SIP MESSAGE request for enabling or disabling the storage of MCData communication storage control request.

TABLE 12

| Code | Explanatory text | Description |
|---|---|---|
| xyz | user not authorized to request for enabling or disabling the storage of MCData communications into the MCData message store | The function is not allowed to this user. |
| abc | unable to determine target user or groupfor enabling or disabling the storage of MCData communications into the MCData message store | The MCData server is unable to determine the targeted user or group for enabling or disabling of the storage of MCData communications |

On request from MCData user at the MCData client device (100), a request to control (i.e. to enable or disable) the storage of MCData communication into the MCData message store is initiated to the participating MCData function by the MCData client device (100).

MCData communications storage control request to enable storage—Upon receiving a request from the MCData user to send a request to control (i.e., enable) the storage of MCData communications request, if the <allow-store-comms-in-msgstore> element of the <ruleset> element is not present in the MCData user profile document (see the MCData user profile document in 3GPP TS 24.484) or is set to a value of "false", the MCData client device (100) shall inform the MCData user and shall exit this procedure.

Upon receiving a request from the MCData user to send a request to enable the storage of MCData communications for private and/or group, the MCData client device (100) shall generate a SIP MESSAGE request in accordance with 3GPP TS 24.229 and IETF RFC 3428 with the clarifications given below. The MCData client device (100)—

1. shall include a Request-URI set to the public service identity identifying the originating participating MCData function serving the MCData user;
2. shall include the ICSI value "urn:urn-7:3gpp-service.ims.icsi.mcdata" (coded as specified in 3GPP TS 24.229), in a P-Preferred-Service header field according to IETF RFC 6050;
3. shall include an Accept-Contact header field with the g.3gpp.icsi-ref media feature tag containing the value of "urn:urn-7:3gpp-service.ims.icsi.mcdata" along with the "require" and "explicit" header field parameters according to IETF RFC 3841;

4. may include a P-Preferred-Identity header field in the SIP MESSAGE request containing a public user identity as specified in 3GPP TS 24.229;
5. shall include an application/vnd.3gpp.mcdata-info+xml MIME body as specified in clause D.1 with the <mcdatainfo> element containing the <mcdata-Params> element with:
a. the <request-type> element set to a value of "store-comms-in-msgstore-ctrl-req";
b. if user want to store all of his/her MCData private communications with other users for which user is authorized to store into MCData message store account, and if requested to store the communications, shall include<store-all-private-comms-in-msgstore>element set to a value of "true"; (or)
c. if user want to store his/her MCData private communications with selected users for which user is authorized to store into MCData message store account, and if requested to store the communications, shall include<store-specific-private-comms-in-msgstore>element set to a value of "enable";
d. if user want to store all of his/her MCData group communications for which user is authorized to store into MCData message store account, and if requested to store the communications, shall include<store-all-group-comms-in-msgstore>element set to a value of "true"; (or)
e. if user want to store his/her MCData group communications of selected MCData groups for which user is authorized to store into MCData message store account, and if requested to store the communications, shall include<store-specific-group-comms-in-msgstore>element set to a value of "enable";
f. the <mcdata-client-id> element set to the MCData client ID of the originating MCData client device (100); and
g. if the MCData client device (100) needs to include an active functional alias in the SIP MESSAGE request, the <functional-alias-URI> set to the URI of the used functional alias;
6. if the <store-specific-private-comms-in-msgstore> or the <store-specific-group-comms-in-msgstore>element is included in an application/vnd.3gpp.mcdata-info+xml MIME body, shall include an application/vnd.3gpp.mcdata-msgstore-ctrl-request+xml MIME body containing with:
a. if the <store-specific-private-comms-in-msgstore>element set to a value of "enable", may include one or more <private> elements of <enable> element containing a MCData ID of the MCData user; and
b. if the <store-specific-group-comms-in-msgstore>element set to a value of "enable", may include one or more <group> elements of <enable> element containing a MCData Group ID; and
7. shall send the SIP MESSAGE request according to rules and procedures of 3GPP TS 24.229.

MCData communications storage control request to disable storage—Upon receiving a request from the MCData user to send a request to control (i.e., disable) the storage of MCData communications request, if the <allow-store-comms-in-msgstore> element of the <ruleset> element is not present in the MCData user profile document (see the MCData user profile document in 3GPP TS 24.484) or is set to a value of "false", the MCData client device (100) shall inform the MCData user and shall exit this procedure.

Upon receiving a request from the MCData user to send a request to disable the storage of MCData communications for private and/or group, the MCData client device (100) shall generate a SIP MESSAGE request in accordance with 3GPP TS 24.229 and IETF RFC 3428 with the clarifications given below. The MCData client device (100)—

1. shall include a Request-URI set to the public service identity identifying the originating participating MCData function serving the MCData user;
2. shall include the ICSI value "urn:urn-7:3gpp-service.ims.icsi.mcdata" (coded as specified in 3GPP TS 24.229), in a P-Preferred-Service header field according to IETF RFC 6050;
3. shall include an Accept-Contact header field with the g.3gpp.icsi-ref media feature tag containing the value of "urn:urn-7:3gpp-service.ims.icsi.mcdata" along with the "require" and "explicit" header field parameters according to IETF RFC 3841;
4. may include a P-Preferred-Identity header field in the SIP MESSAGE request containing a public user identity as specified in 3GPP TS 24.229;
5. shall include an application/vnd.3gpp.mcdata-info+xml MIME body as specified in clause D.1 with the <mcdatainfo> element containing the <mcdata-Params> element with:
a. the <request-type> element set to a value of "store-comms-in-msgstore-ctrl-req";
b. if user do not want to store all of his/her MCData private communications with other users for which user is authorized to store into MCData message store account, and if requested not to store the communications, shall include<store-all-private-comms-in-msgstore>element set to a value of "false"; (or)
c. if user do not want to store his/her MCData private communications with selected users for which user is authorized to store into MCData message store account, and if requested not to store the communications, shall include<store-specific-private-comms-in-msgstore>element set to a value of "disable";
d. if user do not want to store all of his/her MCData group communications for which user is authorized to store into MCData message store account, and if requested not to store the communications, shall include<store-all-group-comms-in-msgstore>element set to a value of "false"; (or)
e. if user do not want to store his/her MCData group communications of selected MCData groups for which user is authorized to store into MCData message store account, and if requested not to store the communications, shall include<store-specific-group-comms-in-msgstore>element set to a value of "disable";
f. the <mcdata-client-id> element set to the MCData client ID of the originating MCData client device (100); and
g. if the MCData client device (100) needs to include an active functional alias in the SIP MESSAGE request, the <functional-alias-URI> set to the URI of the used functional alias;
6. if the <store-specific-private-comms-in-msgstore> or the <store-specific-group-comms-in-msgstore>element is included in an application/vnd.3gpp.mcdata-info+xml MIME body, shall include an application/vnd.3gpp.mcdata-msgstore-ctrl-request+xml MIME body containing with:
a. if the <store-specific-private-comms-in-msgstore>element set to a value of "disable", may include one or more <private> elements of <disable> element containing a MCData ID of the MCData user; and b. if the <store-specific-group-comms-in-msgstore>element set to a value of "disable", may include one or more <group> elements of <disable> element containing a MCData Group ID; and 7. shall send the SIP MESSAGE request according to rules and procedures of 3GPP TS 24.229.

The participating MCData function has procedures to receive a control MCData communications storage request from the MCData client device (100).

Control MCData communication storage request—Upon receipt of a "SIP MESSAGE request for controlling the storage of the MCData communications into MCData message store", the participating MCData function—

1. if unable to process the request due to a lack of resources or a risk of congestion exists, may reject the SIP MESSAGE request with a SIP 500 (Server Internal Error) response. The participating MCData function may include a Retry-After header field to the SIP 500 (Server Internal Error) response as specified in IETF RFC 3261 and skip the rest of the steps;
2. shall determine the MCData ID of the calling user from the public user identity in the P-Asserted-Identity header field of the SIP MESSAGE request;

a. The MCData ID of the calling user is bound to the public user identity at the time of service authorisation.

3. if the participating MCData function cannot find a binding between the public user identity and an MCData ID or if the validity period of an existing binding has expired, then the participating MCData function shall reject the SIP MESSAGE request with a SIP 404 (Not Found) response with the warning text set to "141 user unknown to the participating function" in a Warning header field and shall not continue with any of the remaining steps;
4. if the application/vnd.3gpp.mcdata-info+xml MIME body of the SIP MESSAGE request containing <request-type> element set to a value of "store-comms-in-msgstore-ctrl-req" and:

a. the <allow-store-comms-in-msgstore> element of the <ruleset> element is not present in the MCData user profile document (see the MCData user profile document in 3GPP TS 24.484) or is set to a value of "false", shall reject the SIP MESSAGE request with a SIP 403 (Forbidden) response including warning text set to "xyzuser not authorized to request for enabling or disabling the storage of MCData communications into the MCData message store" in a Warning header field, and shall not continue with the rest of the steps in this subclause;

b. if the <store-all-private-comms-in-msgstore>element is present in the incoming request and the <allow-store-private-comms-in-msgstore> element of the <ruleset> element is not present in the MCData user profile document (see the MCData user profile document in 3GPP TS 24.484) or is set to a value of "false", shall reject the SIP MESSAGE request with a SIP 403 (Forbidden) response including warning text set to "xyzuser not authorized to request for enabling or disabling the storage of MCData communications into the MCData message store" in a Warning header field, and shall not continue with the rest of the steps in this subclause;

c. if the <store-all-group-comms-in-msgstore>element is present in the incoming request and the <allow-store-group-comm-in-msgstore> element of the each <MCDataGroupInfo> element is not present in the MCData user profile document (see the MCData user profile document in 3GPP TS 24.484) or is set to a value of "false", shall reject the SIP MESSAGE request with a SIP 403 (Forbidden) response including warning text set to "xyzuser not authorized to request for enabling or disabling the storage of MCData communications into the MCData message store" in a Warning header field, and shall not continue with the rest of the steps in this subclause;

d. do not contain an application/vnd.3gpp.mcdata-msg-store-ctrl-request+xml MIME body, the <store-all-private-comms-in-msgstore> element, and the <store-all-group-comms-in-msgstore> elements, shall reject the SIP MESSAGE request with a SIP 403 (Forbidden) response including warning text set to "abcunable to determine target user or group for enabling or disabling the storage of MCData communications into the MCData message store" in a Warning header field, and shall not continue with the rest of the steps in this subclause;

e. if the <store-all-group-comms-in-msgstore> element is not present and an application/vnd.3gpp.mcdata-msg-store-ctrl-request+xml MIME body with one or more <group> elements of <enable> or <disable>element are included, then each specified MCPTT group ID matches with the corresponding entry in the each <MCDataGroupInfo> do not contain the <allow-store-group-comm-in-msgstore> element in the MCData user profile document (see the MCData user profile document in 3GPP TS 24.484) or is set to a value of "false", shall reject the SIP MESSAGE request with a SIP 403 (Forbidden) response including warning text set to "xyz user not authorized to request for enabling or disabling the storage of MCData communications into the MCData message store" in a Warning header field, and shall not continue with the rest of the steps in this subclause; (or)

f. if the <store-specific-private-comms-in-msgstore> or <store-specific-group-comms-in-msgstore> is present and the request do not contain an application/resource-lists MIME body, shall reject the SIP MESSAGE request with a SIP 403 (Forbidden) response including warning text set to "abc unable to determine target user or group for enabling or disabling the storage of MCData communications into the MCData message store" in a Warning header field, and shall not continue with the rest of the steps in this subclause;

5. if the application/vnd.3gpp.mcdata-info+xml MIME body of the SIP MESSAGE request contains:

a. if the <store-all-private-comms-in-msgstore> element set to a value of "true", shall update or store the record for the MCData client device (100) and enable the storage of all the MCData private communications for which user is authorized to store the communication into the MCData message store;

b. if the <store-all-private-comms-in-msgstore> element set to a value of "false", shall update or store the record for the MCData client device (100) and disable the storage of all the MCData private communications for which user is authorized to store the communication into the MCData message store;

c. if the <store-specific-private-comms-in-msgstore> element set to a value of "enable", the <store-all-private-comms-in-msgstore> element is not present and an application/vnd.3gpp.mcdata-msgstore-ctrl-request+ xml MIME body with one or more <private> elements of <enable> element are included, shall update or store the record for the MCData client device (100) and enable the storage of MCData private communications of the requesting user with specified list of users for which user is authorized to store the communication into the MCData message store;

d. if the <store-specific-private-comms-in-msgstore> element set to a value of "disable", the <store-all-private-comms-in-msgstore> element is not present and an application/vnd.3gpp.mcdata-msgstore-ctrl-request+xml MIME body with one or more <private> elements of <disable> element are included, shall update or store the record for the MCData client device (100) and disable the storage of MCData private communications of the requesting user with the specified list of users for which user is authorized to store the communication into the MCData message store;

e. if the <store-all-group-comms-in-msgstore> element set to a value of "true", shall update or store the record for the MCData client device (100) and enable the storage of all the MCData group communications for which user is authorized to store the communication into the MCData message store;

f. if the <store-all-group-comms-in-msgstore> element set to a value of "false", shall update or store the record for the MCData client device (100) and disable the storage of all the MCData group communications for which user is authorized to store the communication into the MCData message store;

g. if the <store-specific-group-comms-in-msgstore> element set to a value of "enable", the <store-all-group-comms-in-msgstore> element is not present and an application/vnd.3gpp.mcdata-msgstore-ctrl-request+xml MIME body with one or more <group> elements of <enable> element are included, shall update or store the record for the MCData client device (100) and enable the storage for the specified MCData group communications for which user is authorized to store the communication into the MCData message store; or h. if the <store-specific-group-comms-in-msgstore> element set to a value of "disable", the <store-all-group-comms-in-msgstore> element is not present and an application/vnd.3gpp.mcdata-msgstore-ctrl-request+xml MIME body with one or more <group> elements of <disable> element are included, shall update or store the record for the MCData client device (100) and disable the storage for the specified MCData group communications for which user is authorized to store the communication into the MCData message store;

6. shall generate a SIP 200 (OK) response as specified in 3GPP TS 24.229 with the follow clarifications:

a. shall include the public user identity in the P-Asserted-Identity header; and 7. shall send the SIP 200 (OK) response to the MCData client device (100) according to 3GPP TS 24.229.

The existing <mcdata> element of mcdata info xml is extended to include two new parameters.

If the <mcdatainfo> contains the <mcdata-Params> element then:

1. the <anyExt> can be included with the following elements not declared in the XML schema:

a. a <request-type> of type "xs:string":

i. set to value of "store-comms-in-msgstore-ctrl-req" when a mcdata client device (100) initiates a request to control the storage of MCData communications (private and group) into MCData message store;

b. a <store-all-private-comms-in-msgstore>of type "xs:boolean":

i. set to a value of "true" when the user wants to store his/her MCData private communications into his/her MCData message store account; or ii. set to a value of "false" when the user do not store his/her MCData private communications into his/her MCData message store account;

c. a <store-all-group-comms-in-msgstore> of type "xs:boolean":

i. set to a value of "true" when the user wants to store his/her MCData group communications into his/her MCData message store account; or ii. set to a value of "false" when the user do not store his/her MCData group communications into his/her MCData message store account;

d. a <store-specific-private-comms-in-msgstore> of type "xs:string":

i. set to a value of "enable" when the user wants to store the specified MCData private communications for which user is authorized to store the communication into the MCData message store; or ii. set to a value of "disable" when the user do not wants to store the specified MCData private communications for which user is authorized to store the communication into the MCData message store;

e. a <store-specific-group-comms-in-msgstore> of type "xs:string":

i. set to a value of "enable" when the user wants to store the specified MCData group communications for which user is authorized to store the communication into the MCData message store; or ii. set to a value of "disable" when the user do not wants to store the specified MCData group communications for which user is authorized to store the communication into the MCData message store;

As an alternate, the list of MCData ID or MCData Group ID can be specified by extending the resource list by inserting list corresponds to enable list and disable list for each private and group communications with list name set. The below schema can be used and populated accordingly in procedures above.

```
<?xml
version="1.0"
encoding="UTF-8"
?>
<resource-lists
xmlns="urn:ietf:params:xml:ns:resource-lists">
<list name="enable-private-comms-list">
<entry uri="sip:mcptt_id_private@organization.org"/>
</list>
<list name="disable-private-comms-list">
<entry uri="sip:mcptt_id_private@organization.org"/>
</list>
<list name="enable-group-comms-list">
<entry uri="sip:mcptt_group_id@organization.org"/>
</list>
<list name="disable-group-comms-list">
<entry uri="sip:mcptt_group_id@organization.org"/>
</list>
</resource-lists>
```

The step 6) of "MCData communications storage control request" in above procedure is re-written as below.

6. if the <store-specific-private-comms-in-msgstore> or the <store-specific-group-comms-in-msgstore>element is included in an application/vnd.3gpp.mcdata-info+ xml MIME body, shall include an application/resource-lists+xml MIME body containing with:

a. if the <store-specific-private-comms-in-msgstore>element set to a value of "enable", may include one or more <entry> elements containing aMCData ID of the MCData user in <list> element containing a "name" attribute set to a value of "enable-private-comms-list";

b. if the <store-specific-private-comms-in-msgstore>element set to a value of "disable", may include one or more <entry> elements containing a MCData ID of the MCData user in <list> element containing a "name" attribute set to a value of "disable-private-comms-list";

c. if the <store-specific-group-comms-in-msgstore>element set to a value of "enable", may include one or more <entry> elements containing a MCData group ID in <list> element containing a "name" attribute set to a value of "enable-group-comms-list";

d. if the <store-specific-group-comms-in-msgstore>element set to a value of "disable", may include one or more <entry>elements containing a MCData group ID in <list> element containing a "name" attribute set to a value of "disable-group-comms-list";

The steps 5) c) d) g) h), of "Control MCData communication storage request" in above procedure is re-written as below.

5. if the application/vnd.3gpp.mcdata-info+xml MIME body of the SIP MESSAGE request contains:

c) if the <store-specific-private-comms-in-msgstore> element set to a value of "enable", the <store-all-private-comms-in-msgstore> element is not present and an application/resource-lists+xml MIME body with one or more <entry> elements of <list> element containing a "name" attribute set to a value of "enable-private-comms-list" are included, shall update or store the record for the MCData client device (100) and enable the storage for the specified MCData private communications for which user is authorized to store the communication into the MCData message store;

d) if the <store-specific-private-comms-in-msgstore> element set to a value of "disable", the <store-all-private-comms-in-msgstore> element is not present and an application/resource-lists+xml MIME body with one or more <entry> elements of <list> element containing a "name" attribute set to a value of "disable-private-comms-list" are included, shall update or store the record for the MCData client device (100) and disable the storage for the specified MCData private communications for which user is authorized to store the communication into the MCData message store;

g) if the <store-specific-group-comms-in-msgstore> element set to a value of "enable", the <store-all-group-comms-in-msgstore> element is not present and an application/resource-lists+xml MIME body with one or more <entry> elements of <list> element containing a "name" attribute set to a value of "enable-group-comms-list" are included, shall update or store the record for the MCData client device (100) and enable the storage for the specified MCData group communications for which user is authorized to store the communication into the MCData message store; or h) if the <store-specific-group-comms-in-msgstore> element set to a value of "disable", the <store-all-group-comms-in-msgstore> element is not present and an application/resource-lists+xml MIME body with one or more <entry> elements of <list> element containing a "name" attribute set to a value of "disable-group-comms-list" are included, shall update or store the record for the MCData client device (100) and disable the storage for the specified MCData group communications for which user is authorized to store the communication into the MCData message store;

In another embodiments, some of the solutions are as follows—

1. MCData private/group communications storage control request to enable or disable In an alternate proposal, the standalone request carry both the private and group communications related storage control indications for enabling storage of the communications into message store. Similarly, the standalone request carry both the private and group communications related storage control indications for disabling storage of the communications into message store.

SIP MESSAGE request—The MCData server (200) needs to distinguish between the following SIP MESSAGE request for originations and terminations.

SIP MESSAGE requests routed to the participating MCData function as a result of initial filter criteria with the Request-URI set to the public service identity of the participating MCData function and containing a Content-Type header field set to "application/vnd.3gpp.mcdata-info+xml" and including an XML body containing a <mcdatainfo> root element containing a <mcdata-Params> element containing an <anyExt> element with the <request-type> element set to a value of "store-comms-in-msgstore-ctrl-req". Such requests are known as "SIP MESSAGE request for controlling the storage of the MCData communications into MCData message store".

Warning texts—Table below defines the warning texts that are defined for the Warning header field when a Warning header field is included in a response to a SIP MESSAGE request for enabling or disabling the storage of MCData communication storage control request.

TABLE 13

| Code | Explanatory text | Description |
|---|---|---|
| xyz | user not authorized to request for enabling or disabling the storage of MCData communications into the MCData message store | The function is not allowed to this user. |
| abc | unable to determine target user or groupfor enabling or disabling the storage of MCData communications into the MCData message store | The MCData server is unable to determine the targeted user or group for enabling or disabling of the storage of MCData communications |

On request from MCData user at the MCData client device (100), a request to control (i.e. to enable or disable) the storage of MCData communication into the MCData message store is initiated to the participating MCData function.

MCData communications storage control request—Upon receiving a request from the MCData user to send a request to control (i.e., enable or disable) the storage of MCData communications request, if the <allow-store-comms-in-msgstore> element of the <ruleset> element is not present in the MCData user profile document (see the MCData user profile document in 3GPP TS 24.484) or is set to a value of "false", the MCData client device (100) shall inform the MCData user and shall exit this procedure.

Upon receiving a request from the MCData user to send a request to enable or disable the storage of MCData communications for private and/or group, the MCData client device (100) shall generate a SIP MESSAGE request in accordance with 3GPP TS 24.229 and IETF RFC 3428 with the clarifications given below. The MCData client device (100):

1. shall include a Request-URI set to the public service identity identifying the originating participating MCData function serving the MCData user;
2. shall include the ICSI value "urn:urn-7:3gpp-service.ims.icsi.mcdata" (coded as specified in 3GPP TS 24.229), in a P-Preferred-Service header field according to IETF RFC 6050;
3. shall include an Accept-Contact header field with the g.3gpp.icsi-ref media feature tag containing the value of "urn:urn-7:3gpp-service.ims.icsi.mcdata" along with the "require" and "explicit" header field parameters according to IETF RFC 3841;
4. may include a P-Preferred-Identity header field in the SIP MESSAGE request containing a public user identity as specified in 3GPP TS 24.229;
5. shall include an application/vnd.3gpp.mcdata-info+xml MIME body as specified in clause D.1 with the <mcdatainfo> element containing the <mcdata-Params> element with:

a. the <request-type> element set to a value of "store-comms-in-msgstore-ctrl-req";

b. if user want to store or not store all of his/her MCData private communications with other users for which user is authorized to store into MCData message store account, and i. if requested to store the communications, shall include<store-all-private-comms-in-msgstore>element set to a value of "true". (or)

ii. if requested to not to store the communications, shall include <store-all-private-comms-in-msgstore> element set to a value of "false";

c. if user want to store or not store his/her MCData private communications with selected users for which user is authorized to store into MCData message store account, and:

i. if requested to store the communications, shall include<store-specific-private-comms-in-msgstore>element set to a value of "enable". (or)

ii. if requested not to store the communications, shall include <store-specific-private-comms-in-msgstore> element set to a value of "disable";

d. if user want to store or not store all of his/her MCData group communications for which user is authorized to store into MCData message store account, and i. if requested to store the communications, shall include<store-all-group-comms-in-msgstore>element set to a value of "true". (or)

ii. if requested not to store the communications, shall include<store-all-group-comms-in-msgstore>element set to a value of "false";

e. if user want to store or not store his/her MCData group communications of selected MCData groups for which user is authorized to store into MCData message store account, and i. if requested to store the communications, shall include<store-specific-group-comms-in-msgstore>element set to a value of "enable". (or)

ii. if requested to store the communications, shall include<store-specific-group-comms-in-msgstore>element set to a value of "disable";

f. the <mcdata-client-id> element set to the MCData client ID of the originating MCData client device (100); and g. if the MCData client device (100) needs to include an active functional alias in the SIP MESSAGE request, the <functional-alias-URI> set to the URI of the used functional alias;

6. if the <store-specific-private-comms-in-msgstore> or the <store-specific-group-comms-in-msgstore>element is included in an application/vnd.3gpp.mcdata-info+xml MIME body, shall include an application/vnd.3gpp.mcdata-msgstore-ctrl-request+xml MIME body containing with— a. if the <store-specific-private-comms-in-msgstore>element set to a value of "enable", may include one or more <private> elements of <enable> element containing a MCData ID of the MCData user;

b. if the <store-specific-private-comms-in-msgstore>element set to a value of "disable", may include one or more <private> elements of <disable> element containing a MCData ID of the MCData user;

c. if the <store-specific-group-comms-in-msgstore>element set to a value of "enable", may include one or more <group> elements of <enable> element containing a MCData Group ID; and d. if the <store-specific-group-comms-in-msgstore>element set to a value of "disable", may include one or more <group> elements of <disable> element containing a MCData Group ID; and 7. shall send the SIP MESSAGE request according to rules and procedures of 3GPP TS 24.229.

The participating MCData function has procedures to receive a control MCData communications storage request from the MCData client device (100).

Control MCData communication storage request—Upon receipt of a "SIP MESSAGE request for controlling the storage of the MCData communications into MCData message store", the participating MCData function—

1. if unable to process the request due to a lack of resources or a risk of congestion exists, may reject the SIP MESSAGE request with a SIP 500 (Server Internal Error) response. The participating MCData function may include a Retry-After header field to the SIP 500 (Server Internal Error) response as specified in IETF RFC 3261 and skip the rest of the steps;
2. shall determine the MCData ID of the calling user from the public user identity in the P-Asserted-Identity header field of the SIP MESSAGE request;

a. The MCData ID of the calling user is bound to the public user identity at the time of service authorisation.

3. if the participating MCData function cannot find a binding between the public user identity and an MCData ID or if the validity period of an existing binding has expired, then the participating MCData function shall reject the SIP MESSAGE request with a SIP 404 (Not Found) response with the warning text set to “141 user unknown to the participating function” in a Warning header field and shall not continue with any of the remaining steps;
4. if the application/vnd.3gpp.mcdata-info+xml MIME body of the SIP MESSAGE request containing <request-type>element set to a value of “store-comms-in-msgstore-ctrl-req” and:
a. the <allow-store-comms-in-msgstore> element of the <ruleset> element is not present in the MCData user profile document (see the MCData user profile document in 3GPP TS 24.484) or is set to a value of “false”, shall reject the SIP MESSAGE request with a SIP 403 (Forbidden) response including warning text set to “xyzuser not authorized to request for enabling or disabling the storage of MCData communications into the MCData message store” in a Warning header field, and shall not continue with the rest of the steps in this subclause;
b. if the <store-all-private-comms-in-msgstore>element is present in the incoming request and the <allow-store-private-comms-in-msgstore> element of the <ruleset> element is not present in the MCData user profile document (see the MCData user profile document in 3GPP TS 24.484) or is set to a value of “false”, shall reject the SIP MESSAGE request with a SIP 403 (Forbidden) response including warning text set to “xyzuser not authorized to request for enabling or disabling the storage of MCData communications into the MCData message store” in a Warning header field, and shall not continue with the rest of the steps in this subclause;
c. if the <store-all-group-comms-in-msgstore>element is present in the incoming request and the <allow-store-group-comm-in-msgstore> element of the each <MCDataGroupInfo> element is not present in the MCData user profile document (see the MCData user profile document in 3GPP TS 24.484) or is set to a value of “false”, shall reject the SIP MESSAGE request with a SIP 403 (Forbidden) response including warning text set to “xyzuser not authorized to request for enabling or disabling the storage of MCData communications into the MCData message store” in a Warning header field, and shall not continue with the rest of the steps in this subclause;
d. do not contain an application/vnd.3gpp.mcdata-msgstore-ctrl-request+xml MIME body, the <store-all-private-comms-in-msgstore> element, and the <store-all-group-comms-in-msgstore> elements, shall reject the SIP MESSAGE request with a SIP 403 (Forbidden) response including warning text set to “abcunable to determine target user or group for enabling or disabling the storage of MCData communications into the MCData message store” in a Warning header field, and shall not continue with the rest of the steps in this subclause;
c. if the <store-all-group-comms-in-msgstore> element is not present and an application/vnd.3gpp.mcdata-msgstore-ctrl-request+xml MIME body with one or more <group> elements of <enable> or <disable> element are included, then each specified MCPTT group ID matches with the corresponding entry in the each <MCDataGroupInfo> do not contain the <allow-store-group-comm-in-msgstore> element in the MCData user profile document (see the MCData user profile document in 3GPP TS 24.484) or is set to a value of “false”, shall reject the SIP MESSAGE request with a SIP 403 (Forbidden) response including warning text set to “xyz user not authorized to request for enabling or disabling the storage of MCData communications into the MCData message store” in a Warning header field, and shall not continue with the rest of the steps in this subclause; (or)
f. if the <store-specific-private-comms-in-msgstore> or <store-specific-group-comms-in-msgstore> is present and the request do not contain an application/vnd.3gpp.mcdata-msgstore-ctrl-request+xml MIME body, shall reject the SIP MESSAGE request with a SIP 403 (Forbidden) response including warning text set to “abc unable to determine target user or group for enabling or disabling the storage of MCData communications into the MCData message store” in a Warning header field, and shall not continue with the rest of the steps in this subclause;
5. if the application/vnd.3gpp.mcdata-info+xml MIME body of the SIP MESSAGE request contains:
a. if the <store-all-private-comms-in-msgstore> element set to a value of “true”, shall update or store the record for the MCData client device (100) and enable the storage of all the MCData private communications for which user is authorized to store the communication into the MCData message store;
b. if the <store-all-private-comms-in-msgstore>element set to a value of “false”, shall update or store the record for the MCData client device (100) and disable the storage of all the MCData private communications for which user is authorized to store the communication into the MCData message store;
c. if the <store-specific-private-comms-in-msgstore> element set to a value of “enable”, the <store-all-private-comms-in-msgstore> element is not present and an application/vnd.3gpp.mcdata-msgstore-ctrl-request+xml MIME body with one or more <private> elements of <enable> element are included, shall update or store the record for the MCData client device (100) and enable the storage for the specified MCData private communications for which user is authorized to store the communication into the MCData message store;
d. if the <store-specific-private-comms-in-msgstore> element set to a value of “disable”, the <store-all-private-comms-in-msgstore> element is not present and an application/vnd.3gpp.mcdata-msgstore-ctrl-request+xml MIME body with one or more <private> elements of <disable> element are included, shall update or store the record for the MCData client device (100) and disable the storage for the specified MCData private communications for which user is authorized to store the communication into the MCData message store;
e. if the <store-all-group-comms-in-msgstore> element set to a value of “true”, shall update or store the record for the MCData client device (100) and enable the storage of all the MCData group communications for which user is authorized to store the communication into the MCData message store;
f. if the <store-all-group-comms-in-msgstore> element set to a value of “false”, shall update or store the record for the MCData client device (100) and disable the storage of all the MCData group communications for which user is authorized to store the communication into the MCData message store;

g. if the <store-specific-group-comms-in-msgstore> element set to a value of "enable", the <store-all-group-comms-in-msgstore> element is not present and an application/vnd.3gpp.mcdata-msgstore-ctrl-request+xml MIME body with one or more <group> elements of <enable> element are included, shall update or store the record for the MCData client device (100) and enable the storage for the specified MCData group communications for which user is authorized to store the communication into the MCData message store; or h. if the <store-specific-group-comms-in-msgstore> element set to a value of "disable", the <store-all-group-comms-in-msgstore> element is not present and an application/vnd.3gpp.mcdata-msgstore-ctrl-request+xml MIME body with one or more <group> elements of <disable> element are included, shall update or store the record for the MCData client device (100) and disable the storage for the specified MCData group communications for which user is authorized to store the communication into the MCData message store;

6. shall generate a SIP 200 (OK) response as specified in 3GPP TS 24.229 with the follow clarifications— a. shall include the public user identity in the P-Asserted-Identity header; and 7. shall send the SIP 200 (OK) response to the MCData client device (100) according to 3GPP TS 24.229.

The existing <mcdata> element of mcdata info xml is extended to include two new parameters.

If the <mcdatainfo> contains the <mcdata-Params> element then:

1. the <anyExt> can be included with the following elements not declared in the XML schema:

a. a <request-type> of type "xs:string":

i. set to value of "store-comms-in-msgstore-ctrl-req" when a mcdata client device (100) initiates a request to control the storage of MCData communications (private and group) into MCData message store;

b. a <store-all-private-comms-in-msgstore> of type "xs:boolean":

i. set to a value of "true" when the user wants to store his/her MCData private communications into his/her MCData message store account; or ii. set to a value of "false" when the user do not store his/her MCData private communications into his/her MCData message store account;

c. a <store-all-group-comms-in-msgstore> of type "xs:boolean":

i. set to a value of "true" when the user wants to store his/her MCData group communications into his/her MCData message store account; or ii. set to a value of "false" when the user do not store his/her MCData group communications into his/her MCData message store account;

d. a <store-specific-private-comms-in-msgstore> of type "xs:string":

i. set to a value of "enable" when the user wants to store the specified MCData private communications for which user is authorized to store the communication into the MCData message store; or ii. set to a value of "disable" when the user do not wants to store the specified MCData private communications for which user is authorized to store the communication into the MCData message store;

e. a <store-specific-group-comms-in-msgstore> of type "xs:string":

i. set to a value of "enable" when the user wants to store the specified MCData group communications for which user is authorized to store the communication into the MCData message store; or ii. set to a value of "disable" when the user do not wants to store the specified MCData group communications for which user is authorized to store the communication into the MCData message store;

As an alternate, the list of MCData ID or MCData Group ID can be specified by extending the resource list by inserting list corresponds to enable list & disable list for each private and group communications with list name set. The below schema can be used and populated accordingly in procedures above.

```
<?xml
version="1.0"
encoding="UTF-8"
?>
<resource-lists
xmlns="urn:ietf:params:xml:ns:resource-lists">
<list name="enable-private-comms-list">
<entry uri="sip:mcptt_id_private@organization.org"/>
</list>
<list name="disable-private-comms-list">
<entry uri="sip:mcptt_id_private@organization.org"/>
</list>
<list name="enable-group-comms-list">
<entry uri="sip:mcptt_group_id@organization.org"/>
</list>
<list name="disable-group-comms-list">
<entry uri="sip:mcptt_group_id@organization.org"/>
</list>
</resource-lists>
```

The step 6) of "MCData communications storage control request" in above procedure is re-written as below.

6) if the <store-specific-private-comms-in-msgstore> or the <store-specific-group-comms-in-msgstore>element is included in an application/vnd.3gpp.mcdata-info+xml MIME body, shall include an application/resource-lists+xml MIME body containing with:

a) if the <store-specific-private-comms-in-msgstore>element set to a value of "enable", may include one or more <entry> elements containing a MCData ID of the MCData user in <list> element containing a "name" attribute set to a value of "enable-private-comms-list";

b) if the <store-specific-private-comms-in-msgstore>element set to a value of "disable", may include one or more <entry> elements containing aMCData ID of the MCData user in <list> element containing a "name" attribute set to a value of "disable-private-comms-list";

c) if the <store-specific-group-comms-in-msgstore>element set to a value of "enable", may include one or more <entry> elements containing aMCData group ID in <list> element containing a "name" attribute set to a value of "enable-group-comms-list";

d) if the <store-specific-group-comms-in-msgstore>element set to a value of "disable", may include one or more <entry> elements containing a MCData group ID in <list> element containing a "name" attribute set to a value of "disable-group-comms-list";

The steps 5) c) d) g) h), of "Control MCData communication storage request" in above procedure is re-written as below.

5) if the application/vnd.3gpp.mcdata-info+xml MIME body of the SIP MESSAGE request contains:

c) if the <store-specific-private-comms-in-msgstore> element set to a value of "enable", the <store-all-private-comms-in-msgstore> element is not present and an application/resource-lists+xml MIME body with one or more <entry> elements of <list> element containing a "name" attribute set to a value of "enable-private-comms-list" are included, shall update or store the record for the MCData client device (100) and enable the storage for the specified MCData private communications for which user is authorized to store the communication into the MCData message store;

d) if the <store-specific-private-comms-in-msgstore> element set to a value of "disable", the <store-all-private-comms-in-msgstore> element is not present and an application/resource-lists+xml MIME body with one or more <entry> elements of <list> element containing a "name" attribute set to a value of "disable-private-comms-list" arc included, shall update or store the record for the MCData client device (100) and disable the storage for the specified MCData private communications for which user is authorized to store the communication into the MCData message store;

g) if the <store-specific-group-comms-in-msgstore> element set to a value of "enable", the <store-all-group-comms-in-msgstore> element is not present and an application/resource-lists+xml MIME body with one or more <entry> elements of <list> element containing a "name" attribute set to a value of "enable-group-comms-list" are included, shall update or store the record for the MCData client device (100) and enable the storage for the specified MCData group communications for which user is authorized to store the communication into the MCData message store; or h) if the <store-specific-group-comms-in-msgstore> element set to a value of "disable", the <store-all-group-comms-in-msgstore> element is not present and an application/resource-lists+xml MIME body with one or more <entry>elements of <list> element containing a "name" attribute set to a value of "disable-group-comms-list" are included, shall update or store the record for the MCData client device (100) and disable the storage for the specified MCData group communications for which user is authorized to store the communication into the MCData message store;

FIG. 6 shows various hardware components of the MCData server (200), according to the embodiments as disclosed herein. In an embodiment, the MCData server (200) includes a processor (210), a communicator (220), a memory (230) and a MCData communications storage controller (240). The processor (210) is coupled with the communicator (220), the memory (230) and the MCData communications storage controller (240).

The MCData communications storage controller (240) receives the MCData communication storage control request message from the MCData client device (100) and authorizes the MCData client device (100). Further, the MCData communications storage controller (240) stores the MCData communication storage control request message to enable or disable storage of the MCData communications into the MCData message store based on the MCData communication storage control request message in response to successful authorization of the MCData client device (100). Further, the MCData communications storage controller (240) sends the MCData communication storage control response message to the MCData client device (100).

Further, the MCData communications storage controller (240) sends the SIP message to the MCData client device (100) in response to unsuccessful authorization of the MCData client device (100).

Further, the MCData communications storage controller (240) receives the MCData communication storage control request message from the MCData client device (100) to update storage of the MCData communications into the MCData message store and authorizes the MCData client device (100). Further, the MCData communications storage controller (240) updates and stores the MCData communication storage control request message to enable or disable storage of the MCData communications into the MCData message store based on the MCData communication storage control request message in response to successful authorization of the MCData client device (100). Further, the MCData communications storage controller (240) sends the MCData communication storage control response message to the MCData client device (100).

The MCData communications storage controller (240) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The MCData communications storage controller (240) and the processor (210) may be integrally implemented or integrally referred to at least one processor.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 6 shows various hardware components of the MCData server (200) but it is to be understood that other embodiments are not limited thereon. In other embodiments, the MCData server (200) may include less or more number of components. Further, the labels or names of the components are used only for illustrative purpose and does not limit the scope of the disclosure. One or more components can be combined together to perform same or substantially similar function in the MCData server (200).

FIG. 7 shows various hardware components of the MCData client device (100), according to the embodiments as disclosed herein. In an embodiment, the MCData client device (100) includes a processor (110), a communicator (120), a memory (130) and a MCData communications storage controller (140). The processor (110) is coupled with the communicator (120), the memory (130) and the MCData communications storage controller (140).

The MCData communications storage controller (140) detects the MCData user request to send the MCData communication storage control request message for controlling storage of the MCData communications into the MCData message store. Further, the MCData communications storage controller (140) generates the SIP message comprising the MCData communication storage control request message based on the MCData user request and sends the SIP message comprising the MCData communication storage control request message to the MCData server (200). Further, the MCData communications storage controller (140) receives the MCData communication storage control response message from the MCData server (200).

Further, the MCData communications storage controller (140) receives the SIP message to the MCData client device (100) in response to unsuccessful authorization of the MCData server (200).

The MCData communications storage controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The MCData communications storage controller (140) and the processor (120) may be integrally implemented or integrally referred to at least one processor.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although the FIG. 7 shows various hardware components of the MCData client device (100) but it is to be understood that other embodiments are not limited thereon. In other embodiments, the MCData client device (100) may include less or more number of components. Further, the labels or names of the components are used only for illustrative purpose and does not limit the scope of the disclosure. One or more components can be combined together to perform same or substantially similar function in the MCData client device (100).

FIG. 8 is a flow chart (S800) illustrating a method, implemented by the MCData server (200), for controlling storage of MCData communications into a MCData message store in a MC network (1000), according to the embodiments as disclosed herein. The operations (S802-S808) are handled by the MCData communications storage controller (240).

At S802, the method includes receiving the MCData communication storage control request message from the MCData client device (100) in the MC network (1000). At S804, the method includes authorizing the MCData client device (100). At S806, the method includes storing the MCData communication storage control request message to enable or disable storage of the MCData communications into the MCData message store based on the MCData communication storage control request message in response to successful authorization of the MCData client device (100). At S808, the method includes sending the MCData communication storage control response message to the MCData client device (100).

FIG. 9 is a flow chart (S900) illustrating method, implemented by the MCData client device (100), for controlling storage of MCData communications into the MCData message store in the MC network (1000), according to the embodiments as disclosed herein. The operations (S902-S908) are handled by the MCData communications storage controller (140).

At S902, the method includes detecting the MCData user request to send the MCData communication storage control request message for controlling storage of the MCData communications into the MCData message store. At S904, the method includes generating the SIP message comprising the MCData communication storage control request message based on the MCData user request. The MCData communication storage control request message is one of a MCData communication enable storage request for group or private to enable storage of the MCData communications between the MCData server (200) and the MCData client devices (100) into the MCData message store, a MCData private communication storage control request to enable storage of MCData private communications between the MCData server and the MCData client device (100) into the MCData message store, a MCData group communication storage control request to enable storage of MCData group communications between the MCData server and the MCData client device (100) into the MCData message store, a MCData communication disable storage request for group or private to disable storage of the MCData communications between the MCData server and the MCData client devices (100) into the MCData message store, a MCData private communication storage control request to disable storage of MCData private communications between the MCData server and the MCData client device (100) into the MCData message store, and a MCData group communication storage control request to disable storage of MCData group communications between the MCData server and the MCData client device (100) into the MCData message store.

At S906, the method includes sending the SIP message comprising the MCData communication storage control request message to the MCData server (200) in the MC network (1000). At S908, the method includes receiving the MCData communication storage control response message from the MCData server (200).

The various actions, acts, blocks, steps, or the like in the flow charts (S800 and S900) may be performed in the order presented, in a different order or simultaneously. Further, in some embodiments, some of the actions, acts, blocks, steps, or the like may be omitted, added, modified, skipped, or the like without departing from the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for managing mission critical data (MCData) by an MCData server, comprising:
receiving a request message for controlling a storage of MCData communications into an MCData message store from an MCData client device;
identifying whether a user of the MCData client device is authorized;
controlling the storage of the MCData communications based on the request message, in case of identifying that the user of the MCData client device is authorized; and
transmitting, to the MCData client device, a response message in response to the request message,
wherein based on identifying that the user is not authorized, the response message includes a warning text selected from a plurality of warning texts, in a warning header field,
wherein the plurality of warning texts comprises:
a first warning text indicating that a related function is not allowed to the user; and
a second warning text indicating that the MCData server is unable to determine a targeted user or group for enabling or disabling of the storage of MCData communications.

2. The method of claim 1, wherein identifying whether the user of the MCData client device is authorized comprises:
identifying that the user of the MCData client device is not authorized if a first information element indicating whether the user of the MCData client device is authorized to store the MCData communications in the MCData message store is not present in an MCData user profile document, or if the first information element in the MCData user profile document is set to a negative value.

3. The method of claim 2, wherein identifying whether the user of the MCData client device is authorized further comprises:
identifying that the user of the MCData client device is not authorized, if the first information element in the MCData user profile document is set to a positive value, a second information element indicating whether the user want to store MCData private communications of the user in the MCData message store is present in the request message, and a third information element indicating whether the user of the MCData client device is authorized to request to store the MCData private communications in the MCData message store is not present in the MCData user profile document, or if the first information element in the MCData user profile document is set to a positive value and the second information element is present in the request message and the third information element in the MCData user profile document is set to a negative value.

4. The method of claim 3, wherein controlling the storage of the MCData communications comprises:
if the second information element in the request message is set to a positive value of "true", enabling to store all the MCData private communications of the user in the MCData message store; and
if the second information element in the request message is set to a negative value, disabling to store all the MCData private communications of the user in the MCData message store.

5. The method of claim 2, wherein identifying whether the user of the MCData client device is authorized further comprises:
identifying that the user of the MCData client device is not authorized, if the first information element in the MCData user profile document is set to a positive value, a fourth information element indicating whether the user want to store MCData group communications of the user in the MCData message store is present in the request message, and a fifth information element of each MCData group information element, the fifth information element indicating whether the user of the MCData client device, is authorized to store MCData private communications in the MCData message store is not present in the MCData user profile document, or if the first information element in the MCData user profile document is set to a positive value and the fourth information element is present in the request message and the fifth information element of each MCData group information element is set to a negative value.

6. The method of claim 5, wherein controlling the storage of the MCData communications comprises:
if the fourth information element in the request message is set to a positive value, enabling to store the MCData group communications of the user in the MCData message store; and
if the fourth information element in the request message is set to a negative value, disabling to store the MCData group communications of the user in the MCData message store.

7. The method of claim 2, wherein identifying whether the user of the MCData client device is authorized further comprises:
identifying that the user of the MCData client device is not authorized, if the request message do not contain an application/vnd.3gpp.mcdata-msgstore-ctrl-request+xml MIME body, a second information element indicating whether the user want to store MCData private communications of the user in the MCData message store, and a fourth information element indicating whether the user want to store MCData group communications of the user in the MCData message store.

8. The method of claim 2, wherein identifying whether the user of the MCData client device is authorized further comprises:
identifying that the user of the MCData client device is not authorized, if a sixth information element indicating whether the user want to store specific MCData private communications of the user in the MCData message store or a seventh information element indicating whether the user want to store specific MCData group communications of the user in the MCData message store is present in the request message and the request message do not contain an application/resource-lists MIME body.

9. The method of claim 8, wherein controlling the storage of the MCData communications comprises:
if the sixth information element in the request message is set to a positive value, a second information element indicating whether the user want to store MCData private communications of the user in the MCData message store is not present in the request message, and an application/vnd.3gpp.mcdata-msgstore-ctrl-request+xml MIME body with one or more 'private' elements of 'enable' element are included in the request message, enabling to store the MCData private communications of the user with specified list of users in the MCData message store; and if the sixth information element in the request message is set to a negative value, the second information element is not present in the request message, and an application/vnd.3gpp.mcdata-msgstore-ctrl-request+xml MIME body with one or more 'private' elements of 'disable' element are included in the request message, disabling to store the MCData private communications of the user with the specified list of users in the MCData message store.

10. The method of claim 8, wherein controlling the storage of the MCData communications comprises:

if the seventh information element in the request message is set to a positive value, a fourth information element indicating whether the user want to store MCData group communications of the user in the MCData message store is not present in the request message, and an application/vnd.3gpp.mcdata-msgstore-ctrl-request+xml MIME body with one or more 'group' elements of 'enable' element are included in the request message, enabling to store the specified MCData group communications of the user in the MCData message store; and if the seventh information element in the request message is set to a negative value, the fourth information element is not present in the request message, and an application/vnd.3gpp.mcdata-msgstore-ctrl-request+xml MIME body with one or more 'group' elements of 'disable' element are included in the request message, disabling to store the specified MCData group communications of the user in the MCData message store.

11. The method of claim 1, wherein an application/vnd.3gpp.mcdata-info+xml MIME body of the request message comprises a request type element set to a value of "store-comms-in-msgstore-ctrl-req".

12. A mission critical data (MCData) server for managing MCData, comprising:

a memory; and at least one processor coupled to the memory, wherein the at least one processor is configured to:

receive a request message for controlling a storage of MCData communications into an MCData message store from an MCData client device;

identify whether a user of the MCData client device is authorized;

control the storage of the MCData communications based on the request message, in case of identifying that the user of the MCData client device is authorized; and transmit, to the MCData client device, a response message in response to the request message, wherein based on identifying that the user is not authorized, the response message includes a warning text selected from a plurality of warning texts, in a warning header field, wherein the plurality of warning texts comprises:

a first warning text indicating that a related function is not allowed to the user; and a second warning text indicating that the MCData server is unable to determine a targeted user or group for enabling or disabling of the storage of MCData communications.

13. A method for managing mission critical data (MCData) by a MCData client device, comprising:

generating a request message for controlling a storage of MCData communications into an MCData message store; and transmitting the request message to a MCData server, wherein generating the request message comprises:

including a request type element set to a value of "store-comms-in-msgstore-ctrl-req" in the request message;

including, in the request message, a store-all-private-comms-in-msgstore element set to a positive value, if a user of the MCData client device wants to store MCData private communications of the user into the MCData message store;

including, in the request message, the store-all-private-comms-in-msgstore element set to a negative value, if the user do not want to store the MCData private communications of the user into the MCData message store;

including, in the request message, a store-all-group-comms-in-msgstore element set to a positive value, if the user wants to store MCData group communications of the user into the MCData message store;

including, in the request message, the store-all-group-comms-in-msgstore element set to a negative value, if the user do not want to store MCData group communications of the user into the MCData message store;

including, in the request message, a store-specific-private-comms-in-msgstore element set to a positive value, if the user wants to store specified MCData private communications of the user into the MCData message store;

including, in the request message, the store-specific-private-comms-in-msgstore element set to a negative value, if the user do not want to store the specified MCData private communications of the user into the MCData message store;

including, in the request message, a store-specific-group-comms-in-msgstore element set to a positive value, if the user wants to store specified MCData group communications of the user into the MCData message store; and including, in the request message, the store-specific-group-comms-in-msgstore element set to a negative value, if the user does not want to store the specified MCData group communications of the user into the MCData message store.

14. The MCData server of claim 12, wherein for identifying whether the user of the MCData client device is authorized, the at least one processor is configured to:

identify that the user of the MCData client device is not authorized if a first information element indicating whether the user of the MCData client device is authorized to store the MCData communications in the MCData message store is not present in an MCData user profile document, or if the first information element in the MCData user profile document is set to a negative value.

15. The MCData server of claim 14, wherein for identifying whether the user of the MCData client device is authorized, the at least one processor is further configured to:

identify that the user of the MCData client device is not authorized, if the first information element in the MCData user profile document is set to a positive value, a second information element indicating whether the user want to store MCData private communications of the user in the MCData message store is present in the request message, and a third information element indicating whether the user of the MCData client device is authorized to request to store the MCData private communications in the MCData message store is not present in the MCData user profile document, or if the first information element in the MCData user profile document is set to a positive value and the second information element is present in the request message and the third information element in the MCData user profile document is set to a negative value.

16. The MCData server of claim 14, wherein for identifying whether the user of the MCData client device is authorized, the at least one processor is further configured to:

identify that the user of the MCData client device is not authorized, if the first information element in the MCData user profile document is set to a positive value, a fourth information element indicating whether the user want to store MCData group communications of the user in the MCData message store is present in the request message, and a fifth information element of each MCData group information element, the fifth information element indicating whether the user of the MCData client device, is authorized to store MCData private communications in the MCData message store is not present in the MCData user profile document, or if the first information element in the MCData user profile document is set to a positive value and the fourth information element is present in the request message and the fifth information element of each MCData group information element is set to a negative value.

17. The MCData server of claim 14, wherein for identifying whether the user of the MCData client device is authorized, the at least one processor is further configured to:

identify that the user of the MCData client device is not authorized, if the request message do not contain an application/vnd.3gpp.mcdata-msgstore-ctrl-request+xml MIME body, a second information element indicating whether the user want to store MCData private communications of the user in the MCData message store, and a fourth information element indicating whether the user want to store MCData group communications of the user in the MCData message store.

18. The MCData server of claim 14, wherein for identifying whether the user of the MCData client device is authorized, the at least one processor is further configured to:

identify that the user of the MCData client device is not authorized, if a sixth information element indicating whether the user want to store specific MCData private communications of the user in the MCData message store or a seventh information element indicating whether the user want to store specific MCData group communications of the user in the MCData message store is present in the request message and the request message do not contain an application/resource-lists MIME body.

19. The MCData server of claim 12, wherein an application/vnd.3gpp.mcdata-info+xml MIME body in the request message comprises a request type element set to a value of “store-comms-in-msgstore-ctrl-req”.

* * * * *